(12) United States Patent
Chang et al.

(10) Patent No.: US 11,039,485 B2
(45) Date of Patent: Jun. 15, 2021

(54) METHOD AND APPARATUS FOR IMPLEMENTING WIRELESS PROTOCOL CONFIGURABLE ACCORDING TO SERVICES AND DEVICES

(71) Applicant: Samsung Electronics Co., Ltd., Suwon-si (KR)

(72) Inventors: Young-Bin Chang, Anyang-si (KR); Anil Agiwal, Suwon-si (KR); Sang-Wook Kwon, Suwon-si (KR); Hyun-Jeong Kang, Seoul (KR); Kyung-Kyu Kim, Suwon-si (KR); Young-Joong Mok, Suwon-si (KR); Sang-Kyu Baek, Yongin-si (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/755,497

(22) PCT Filed: Aug. 30, 2016

(86) PCT No.: PCT/KR2016/009653
§ 371 (c)(1),
(2) Date: Feb. 26, 2018

(87) PCT Pub. No.: WO2017/039283
PCT Pub. Date: Mar. 9, 2017

(65) Prior Publication Data
US 2018/0249513 A1    Aug. 30, 2018

(30) Foreign Application Priority Data

Aug. 31, 2015 (IN) .......................... 4582/CHE/2015
Nov. 10, 2015 (IN) .......................... 6072/CHE/2015
(Continued)

(51) Int. Cl.
*H04W 76/10* (2018.01)
*H04B 7/26* (2006.01)
(Continued)

(52) U.S. Cl.
CPC .............. *H04W 76/10* (2018.02); *H04B 7/26* (2013.01); *H04L 29/06* (2013.01); *H04L 29/08* (2013.01);
(Continued)

(58) Field of Classification Search
CPC ........... H04W 36/0016; H04W 76/048; H04W 36/08; H04L 5/0096; H04L 5/0005;
(Continued)

(56) References Cited

U.S. PATENT DOCUMENTS 9,019,926 B2 * 4/2015 Yi .......................... H04W 72/10
370/329
2010/0091725 A1  4/2010 Ishii
(Continued)

FOREIGN PATENT DOCUMENTS

KR   10-2015-0035616 A   4/2015
KR   10-2015-0053812 A   5/2015
WO      2014-008787 A1   1/2014

OTHER PUBLICATIONS

OFDM Numerology, Christian Pietsch (Qualcomm), 19 pages (Year: 2012).*
(Continued)

*Primary Examiner* — Faruk Hamza
*Assistant Examiner* — Jean F Voltaire

(57) ABSTRACT

Disclosed is a 5G or pre-5G communication system for supporting a data transmission rate higher than that of a 4G communication system such as LTE. A method for communicating with user equipment (UE) by a base station is disclosed. The method comprises the steps of: identifying a
(Continued)

type of one or more services required by the UE; notifying the UE of information on a configuration of a medium access control (MAC) layer and a physical (PHY) layer configured according to the identified type of one or more services; and communicating with the UE on the basis of the information on the configuration of the MAC layer and the PHY layer configured according to the identified type of one or more services.

20 Claims, 16 Drawing Sheets

(30) Foreign Application Priority Data

Mar. 10, 2016 (IN) .............................. 201641008346
May 11, 2016 (IN) .............................. 201641016408

(51) Int. Cl.
| | |
|---|---|
| *H04L 29/06* | (2006.01) |
| *H04L 29/08* | (2006.01) |
| *H04W 28/00* | (2009.01) |
| *H04W 48/14* | (2009.01) |
| *H04W 72/04* | (2009.01) |
| *H04W 80/02* | (2009.01) |

(52) U.S. Cl.
CPC ........... *H04W 28/00* (2013.01); *H04W 48/14* (2013.01); *H04W 72/04* (2013.01); *H04W 80/02* (2013.01)

(58) Field of Classification Search
CPC ... H04L 5/0053; H04L 5/0062; H04L 5/0032; H04B 7/024
USPC ......................................................... 370/329
See application file for complete search history.

(56) References Cited

U.S. PATENT DOCUMENTS

| | | | | |
|---|---|---|---|---|
| 2011/0170495 | A1* | 7/2011 | Earnshaw ............... | H04L 5/001 370/329 |
| 2012/0127934 | A1 | 5/2012 | Anderson et al. | |
| 2012/0250601 | A1 | 10/2012 | Choi et al. | |
| 2012/0269154 | A1 | 10/2012 | Wang et al. | |
| 2014/0086152 | A1 | 3/2014 | Bontu et al. | |
| 2014/0126519 | A1 | 5/2014 | Chun et al. | |
| 2014/0133410 | A1 | 5/2014 | Nguyen et al. | |
| 2014/0135027 | A1 | 5/2014 | Kodali et al. | |
| 2014/0362790 | A1 | 12/2014 | McCann | |
| 2015/0049606 | A1 | 2/2015 | So et al. | |
| 2015/0103793 | A1* | 4/2015 | Peng ..................... | H04W 76/15 370/329 |
| 2015/0110059 | A1 | 4/2015 | Bai et al. | |
| 2015/0271809 | A1* | 9/2015 | Kato ................. | H04W 72/0413 370/329 |
| 2016/0021646 | A1 | 1/2016 | Hu et al. | |
| 2018/0048498 | A1* | 2/2018 | Stern-Berkowitz ......................... | H04W 72/1268 |
| 2018/0227938 | A1 | 8/2018 | Lee et al. | |

OTHER PUBLICATIONS

Extended European Search Report regarding Application No. 16842249. 1, dated Jun. 25, 2018, 9 pages.
Ipwireless, Inc., "Connectionless approaches to supporting Diverse Data Applications", 3GPP TSG RAN WG2 Meeting #77, R2-120444, Feb. 2012, 5 pages.
"3rd Generation Partnership Project; Technical Specification Group Services and System Aspects; System Improvements for Machine-Type Communications; (Release 11)", 3GPP TR 23.888 V1.6.0, Nov. 2011, 161 pages.
ISA/KR, "International Search Report and Written Opinion of the International Search Authority," International Application No. PCT/KR2016/009653, dated Nov. 30, 2016, 11 pages.
Belschner, Jakob, et al., "5G—Enabling a Smart(er) World the Metis Approach," T-Labs; Dec. 4, 2014, 17 pages.
Communication pursuant to Article 94(3) EPC dated Aug. 5, 2019 in connection with European Patent Application No. 16 842 249.1, 6 pages.
USPTO, Non-final Office Action in connection with U.S. Appl. No. 16/288,965 dated Nov. 25, 2019, 27 pages.
Communication pursuant to Article 94(3) EPC in connection European Application No. 16842249.1 dated Mar. 6, 2020, 6 pages.
USPTO, Final Office Action in connection with U.S. Appl. No. 16/288,965 dated Jun. 25, 2020, 19 pages.
Communication pursuant to Article 94(3) EPC dated Oct. 22, 2020 in connection with European Application No. 16842249.1, 7 pages.
Communication pursuant to Article 94(3) EPC dated Mar. 26, 2021 in connection with European Patent Application No. 16 842 249.1, 7 pages.
Office Action dated Jan. 18, 2021 in connection with India Patent Application No. 201817009207, 6 pages.
Non-final Office Action dated Apr. 29, 2021 in connection with US Appl. No. 16/288,965, 26 pages.

* cited by examiner

| 810 | |
|---|---|
| DRB 1 | SERVICE TYPE 1 |
| DRB 2 | SERVICE TYPE 2 |
| DRB 3 | SERVICE TYPE 1 |
| DRB 4 | SERVICE TYPE 2 |

| 820 | |
|---|---|
| Mac CONFIGURATION 1 | SERVICE TYPE 1 |
| Mac CONFIGURATION 2 | SERVICE TYPE 2 |

| 830 | |
|---|---|
| Phy CONFIGURATION 1 | SERVICE TYPE 1 |
| Phy CONFIGURATION 2 | SERVICE TYPE 2 |

FIG.8

METHOD AND APPARATUS FOR IMPLEMENTING WIRELESS PROTOCOL CONFIGURABLE ACCORDING TO SERVICES AND DEVICES

CROSS-REFERENCE TO RELATED APPLICATIONS AND CLAIM OF PRIORITY

This application is a 371 National Phase Entry of PCT International Application No. PCT/KR2016/009653 filed on Aug. 30, 2016, which claims priority to Indian Patent Application No. 4582/CHE/2015 filed on Aug. 31, 2015, to Indian Patent Application No. 6072/CHE/2015 filed on Nov. 10, 2015, to Indian Patent Application No. 201641008346 filed on Mar. 10, 2016, and to Indian Patent Application No. 201641016408 filed on May 11, 2016, each of which are incorporated herein by reference into the present disclosure as if fully set forth herein.

TECHNICAL FIELD

The present disclosure relates to method and apparatus for implementing wireless protocol configurable according to services and devices.

BACKGROUND

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra high frequency band and increase the reach of radio waves, the following techniques are taken into account for the 5G communication system: beamforming, massive multi-input multi-output (MIMO), full dimensional MIMO (FD-MIMO), array antenna, analog beamforming, and large-scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The advent of brand-new services and devices leads to increased demand for mobile communication systems for supporting massive connectivity, lower latency, better reliability, and an ultra-high data rate. It is a most challenging issue to support various requirements for a diversity of types of services and devices in 5G mobile communication systems. It should be noted that all the requirements are not necessary for each service and/or each device. Some services and/or some devices may require only lower latency whereas the others may require an ultra-high data rate as well as tolerable latency.

SUMMARY

In 4G wireless protocol design (e.g., LTE rel-8 system), wireless protocol design has been optimized for voice and mobile data services. However, the LTE baseline may be too inflexible to encompass other new types of services and devices (e.g., low-cost, energy-efficient IoT devices) with different requirements. Thus, there may be a need for a new wireless protocol design capable of efficiently supporting various new types of services and devices, but rather than upgrading the LTE-based wireless protocols in 5G radio protocol design.

In 5G mobile wireless communication protocol design for supporting various services and devices, the same functionality may be supported in various ways specific to the services and/or devices. For example, random access functionality for uplink data transmission should be very reliable and fast to support ultra-reliable and low latency (URLL) services. To achieve this, noncollision-based random access with a reduced number of message exchanges may be taken into account. In random access functionality for enhanced mobile broadband (eMBB) for an ultra-high data rate, the random access procedure is contention-based but may be the same as current 4G mobile communication radio design well optimized for high-data rate mobile data. Hence, 5G radio design integrated to support various devices and services with different requirements is very challenging.

Therefore, an issue that the present disclosure is to address is to provide a wireless protocol capable of efficiently supporting various devices and services.

Objects of the present disclosure are not limited to the foregoing, and other unmentioned objects would be apparent to one of ordinary skill in the art from the following description.

To address the above issue, according to an embodiment of the present disclosure, a method for communicating with a user equipment (UE) by a base station comprises the steps of identifying types of one or more services requested by the UE, notifying the UE of information about configurations of a medium access control (MAC) layer and a physical (PHY) layer configured depending on the types of the one or more services identified, and communicating with the UE based on the information about the configurations of the MAC layer and the PHY layer configured depending on the types of the one or more services identified.

According to another embodiment of the present disclosure, a method for communicating with a base station by a UE comprises the steps of receiving, from the base station, information about configurations of a medium access control (MAC) layer and a physical (PHY) layer configured depending on types of one or more services requested by the UE and communicating with the base station based on the received information about the configurations of the MAC layer and the PHY layer configured depending on the types of the one or more services requested by the UE.

According to another embodiment of the present disclosure, a base station comprises a transceiver and a processor connected with the transceiver, wherein the processor is configured to identify types of one or more services requested by the UE, notify the UE of information about configurations of a medium access control (MAC) layer and a physical (PHY) layer configured depending on the types of the one or more services identified, and communicate with the UE based on the information about the configurations of the MAC layer and the PHY layer configured depending on the types of the one or more services identified.

According to another embodiment of the present disclosure, a user equipment (UE) comprises a transceiver and a processor connected with the transceiver, wherein the processor is configured to receive, from the base station, information about configurations of a medium access control (MAC) layer and a physical (PHY) layer configured depending on types of one or more services requested by the UE and communicate with the base station based on the received information about the configurations of the MAC layer and the PHY layer configured depending on the types of the one or more services requested by the UE.

Details of other embodiments are set forth in the detailed description and the drawings.

Embodiments of the present disclosure present the following effects, at least.

That is, there may be provided a wireless protocol capable of efficiently supporting various devices and services.

The effects of the present disclosure are not limited thereto, and the disclosure encompass other various effects.

BRIEF DESCRIPTION OF THE DRAWINGS

FIG. 8 illustrates information indicating MAC/PHY configurations for each DRB according to another embodiment of the present disclosure;

DETAILED DESCRIPTION

Figure 1:
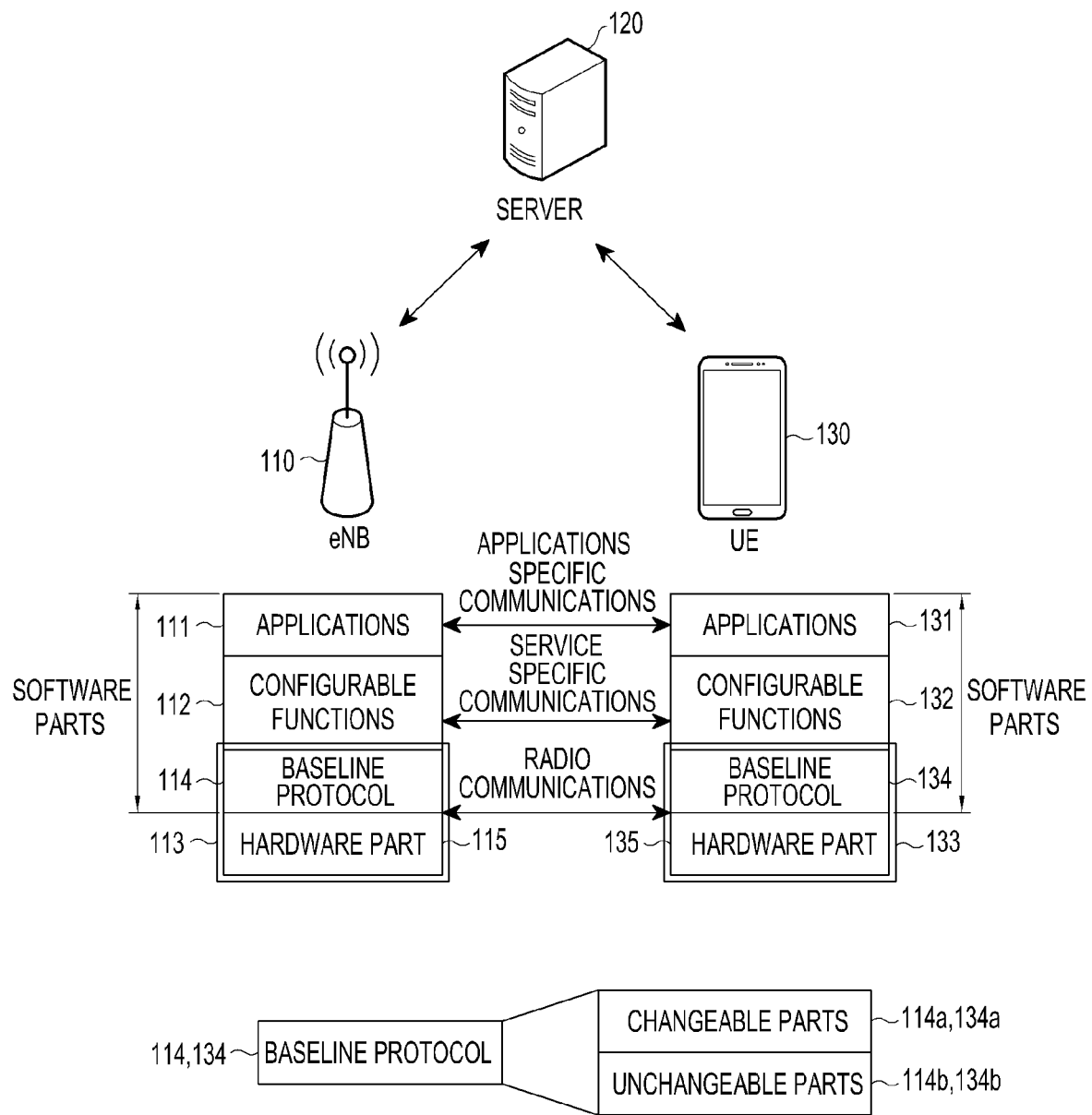
FIG. 1 illustrates a wireless protocol between an eNB and a UE according to an embodiment of the present disclosure.

Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims.

Although the terms "first" and "second" are used to describe various components, the components are not limited by the terms. These terms are provided simply to distinguish one component from another. Accordingly, the first component mentioned herein may also be the second component within the technical spirit of the present disclosure.

According to an embodiment of the present disclosure, a radio protocol may include a lightweight baseline. The baseline may include necessary functions for each service and/or device. Additional functions specific to the service and/or device may be provided as necessary. That is, the baseline may include only minimum functions for wireless communication and may not include functions for particular purposes and/or devices.

Common functions for wireless communication may be extracted to support 5G services and devices that require an ultra-high data rate, high reliability, lower latency, and massive connectivity. Such common functions may be related to simple wireless communication with other devices and nodes. For example, minimum control functions (e.g., cell attach or radio resource indication) may be needed to support simple wireless communication. Data and basic user plane functions (e.g., generating protocol data unit (PDU) or random access) may also be required. In embodiments of the present disclosure, RF and baseband hardware may also be necessary for wireless communication. That is, in embodiments of the present disclosure, radio baseline functions may be operated regardless of RF and baseband chipsets and spectra. For inter-operability, such baseline radio protocol functions may be common parts of various nodes and devices supportive of different use cases and service requirements.

A lightweight 5G baseline configuration may be a common part of the protocol, and other functions may be operated on the baseline protocol. For example, an ultra-high data rate (e.g., 10 times as high as a 4G data rate) should be supported to support eMBB services. To support such requirement, beamforming may be an inevitable functional block in the cases where a higher frequency band, such as that of mmWave, is used. In some embodiments, however, beamforming may be unnecessary for ultra-reliable low latency (URLL) and machine-type communication (MTC). Therefore, beamforming may be configurable in a higher portion of the baseline protocol, nodes, and devices, to support eMBB-type services. As another example, high-speed hybrid automatic repeat request (HARM) and high-speed handover may be used for nodes and devices in case of low-latency services. In case of MTC, energy-efficient discontinuous reception (DRX) may be a material function. For new services that are not identified yet, only configurable functional blocks may be designed and implemented in nodes or devices without changing the baseline functions. This may be achieved by upgrading software, but rather than changing hardware. The scalability and flexibility of nodes or devices for new services may be simpler than changing the overall radio protocol.

In some embodiments, the afore-mentioned baseline protocol may be commonly implemented regardless of MTC, URLL, and eMBB services. However, in other embodiments, configurable functions may be implemented for certain services alone. An eNB or a UE may support different types of services, and thus, configurable functions may be implemented. Depending on different configurable functions, an eNB or a UE may have a different profile or service category. In case a single eNB or UE should support multiple services, multiple profiles or service categories may be implemented. For example, in case an eNB or UE is used in a factory area, both an ultra-reliable (UR) service and an eMBB service may be supported using two configurable profiles.

In case of MTC services, an eNB or UE may be stationary or nomadic. Accordingly, in some embodiments, mobility functions such as a handover in radio resource control (RRC) may not be needed, and packet data convergence protocol (PDCP)/radio link control (RLC) may become very lightweight for saving costs. Meanwhile, in case of URLL services, the RLF function for retransmission may need to be very robust for reliability. The HARQ and random access procedure may need to be very fast for low latency of data transfer. In case of eMBB services, beamforming should be able to be supported as a configurable function for a higher frequency band (e.g., mmWave). To support unlicensed bands in eMBB services, the listen before talk (LBT) function should be able to be supported.

Hereinafter, an eNB and a user equipment (UE) with a radio protocol according to an embodiment of the present disclosure is described with reference to FIG. 1. FIG. 1 illustrates an eNB and a UE with a radio protocol according to an embodiment of the present disclosure. An eNB 110 may include a hardware part 115 and software parts 111, 112, and 114. A UE 130 may also include a hardware part 135 and software parts 131, 132, and 134. The hardware parts 115 and 135 mean radio frequency (RF) and/or baseband blocks that are difficult to update by a server 120. The software parts 111, 112, 114, 131, 132, and 134 mean software implemented blocks that may be updated by the server 120. The server 120 may manage the software parts 111, 112, 114, 131, 132, and 134 of the eNB 110 or the UE 130 for a particular use case. The hardware parts 115 and 135 and baseline protocol parts 114 and 134 may be associated with wireless communication between the eNB 110 and the UE 130.

In FIG. 1, configurable functions 112 and 132 are parts variably configurable in the cases where the service supposed to be supported by the eNB 110 and the UE 130 should be changed. For example, the eNB 110 and the UE 130 that support voice services may reconfigure the configurable functions 112 and 132, additionally providing, e.g., an IoT service. In other words, although conventional eNBs and UEs have offered fixed services according to fixed functionality, the eNB 110 and UE 130, as per embodiments of the present disclosure, may support new services by changing the configurable functions 112 and 132 even without changing the overall eNB 110 and UE 130. The configurable functions 112 and 132 may be updated by the server 120 to support a new service.

Baseline protocols 114 and 134 may include baseline functions (e.g., network access) for communication between the eNB 110 and the UE 130, and in some embodiments, the baseline protocols 114 and 134 may be defined as baseline functions of wireless communication. The baseline protocols 114 and 134 may be irrelevant to the configurable parts 112 and 114 which may be changed by services. In a case where the version of the baseline protocols 114 and 134 is changed for a certain reason, the changeable parts 114a and 134a of the baseline protocols 114 and 134 may also be changed by upgrading the software. However, non-changeable parts 114b and 134b may not be changed via software update.

Figure 2:
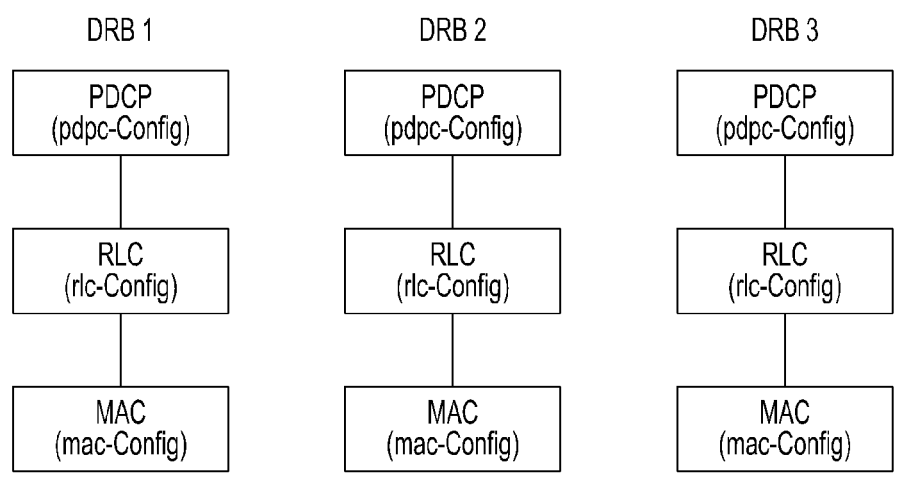
FIG. 2 illustrates configurations of a PDCP, an RLC, and an MAC according to an embodiment of the present disclosure.

The configuration of a radio bearer according to an embodiment of the present disclosure is described below with reference to FIG. 2. FIG. 2 illustrates the configuration of a radio bearer according to an embodiment of the present disclosure. Data radio bearers (DRBs) may be set up between a UE and an eNB. IP packets requiring different QoSs may be mapped to different DRBs. A user plane protocol stack may include a PDCP layer, an RLC layer, and a media access control (MAC) layer. The PDCP layer and RLC layer functions may be configured to be specific to their respective DRBs. In case of 4G system, MAC layer functions may be common to all DRBs or for all logical channels associated with DRBs. Only parameters related to logical channel priority may be configured for each logical channel. Such configurations in 4G system may be inefficient in supporting various types of services (e.g., eMBB services, URLL services, and mMTC services).

In some embodiments of the present disclosure, MAC layer functions and/or parameters may be configured to be specific to a radio bearer, flow, or logical channel. One or more internet protocol (IP) flows may be mapped to one radio bearer or flow. As per some embodiments, one IP flow may be one radio bearer or flow. Such configuration may be based on an air interface set (AIS) or a service (or radio access network (RAN) slice or network (NW)) associated with a radio bearer or flow. One or more radio bearers/flows/logical channels may be mapped to one service (or RAN slice, NW slice, or AIS). Mapping the radio bearers/flows/logical channels to the service (or RAN slice, NW slice, or AIS) may be signaled in RRC signaling. That is, in some embodiments, three DRBs may be generated for three different services (or RAN slices, NW slices, or AISs) as shown in FIG. 2. An AIS may be a set of PHY layer parameters and/or functions/features. In other embodiments, three DRBs may be generated for at least two services (or RAN slices or NW slices) as shown in FIG. 2. A PDCP, RLC, and MAC may be configured for each DRB. An MAC entity may be one entity supportive of different configurations or may be separate for each configuration. In embodiments of the present disclosure, as an MAC as well as a PDCP and RLC may be configured DRB-specifically as shown in FIG. 2, various types of services (e.g., eMBB, ULLR, or MTC) may efficiently be supported.

MAC layer functions and/or parameters configurable to be specific to one or more radio bearers, flows, or logical channels may include one or more of the parameters described below.

HARQ Protocol Configuration:
  Different types of HARQ protocols may be defined in system. For example, it may be defined as at least one of ah HARQ protocol with only ACK, an HARQ protocol with both ACK and NACK, an HARQ protocol without feedback, and a no HARQ protocol. The type of HARQ protocol may be configured to be specific to a radio bearer or flow. Alternatively, the type of HARQ feedback for HARQ protocol (e.g., with ACK or NACK or both or neither) may be configured to be specific to radio bearer/flow/RAN slice/NW slice/AIS.

At least one HARQ protocol parameters among HARQ protocol timing parameters (i.e., transmission time interval (TTI)), interval between transmission and feedback, interval between feedback and retransmission, number of retransmissions, number of retransmissions that do not wait for feedback, interval between resource allocation and actual (re)transmission, and synchronous or asynchronous HARQ may be configured to be specific to radio bearer/flow/logical channel/RAN slice/NW slice/AIS.

Uplink (UL) scheduling type configuration:

Different types of UL scheduling may be defined in system. For example, At least one UL scheduling types among semi-persistent periodic grant, scheduling request (SR)-based grant, SR+buffer status report (BSR)-based grant, channel detection and transmission, and random or detection-based resource selection from a contention-based resource pool may be defined. A UL scheduling type may be configured to be specific to radio bearer/flow/logical channel/RAN slice/NW slice/AIS.

At least one uplink scheduling parameters among period for periodic grant, resource pool for contention-based resource pool, and SR resources (i.e., time and/or frequency and/or sequence) may be configured to be specific to radio bearer/flow/logical channel/RAN slice/NW slice/AIS.

MAC control type configuration:

A random access configuration (e.g., RACH chance and/or RACH preambles) may differ for different services (or RAN slices, NW slices, or AISs). The type of random access (e.g., whether it is contention-based or dedicated) may differ for different services (or RAN slices, NW slices, or AISs). At least one of random access channel configuration and random access type may be configured to be specific to radio bearer/flow/logical channel/RAN slice/NW slice/AIS.

A DRX configuration may differ for different services (or RAN slices, NW slices, or AISs). For example, a DRX configuration may be configured as an ON period during which data transmission and reception are possible and an OFF period during which data transmission and reception are impossible. Here, the parameters or functions of the ON period and OFF period may differ per service.

In some embodiments, the configurations may be configured (e.g., in RRC signaling) or may previously be defined for each service (or RAN slice, NW slice, or AIS). While a radio bearer is configured, a service type (or RAN slice ID/type, NW slice ID/type, or AIS ID/type) associated with the radio bearer may be signaled rather than the overall configuration being provided. Alternatively, a service type (or RAN slice ID/type, NW slice ID/type, or AIS ID/type) associated with an evolved packet system (EPS) bearer may be signaled while the EPS bearer is configured. Radio bearers/flows associated with the EPS bearer may have the same service type (or RAN slice ID/type, NW slice ID/type, or AIS ID/type), and thus, a configuration to be used may be recognized.

In some embodiments, a default MAC configuration may be defined. Each radio bearer/flow may use the default MAC configuration unless a service (or RAN slice, NW slice, or AIS)—specific radio bearer/flow or associated EPS bearer is configured. For example, the UE may be located outside the coverage or may obtain none of the service-specific information. In such case, the UE may be operated using the default MAC configuration which is a set of parameters previously defined in the UE and is irrelevant (agnostic) to the type of radio bearer/flow.

In some embodiments, more than one radio bearer or flow may be configured for a particular service type (or RAN slice ID/type, NW slice ID/type, or AIS ID/type). In other words, more than one radio bearer or flow may have the same configuration.

In some embodiments, the UE may be allocated a grant. The UE may use logical channel prioritization (LCP) to prepare for MAC PDU based on the allocated grant. LCP may be applicable to all logical channels. Where different services are associated with different physical (PHY) configurations (e.g., physical channels or resources) and/or MAC configurations (e.g., HARQ protocols), LCP should be applied over logical channels with the same configuration or the same logical channels corresponding to the radio bearers of the same service (or RAN slice or NW slice). Where resources remain after considering the logical channels with the same configuration or logical channels corresponding to the radio bearers of the same service (or RAN slice, NW slice, or AIS) allocated a grant, the UE may allow data from logical channels of a different service (or RAN slice, NW slice, or AIS) to be included. Where the grant is for service X (or RAN slice X, NW slice X, or AIS X), other service(s) (or RAN slices, NW slices X, or AISs) that may be multiplexed in the grant, may be defined previously or configured by the network. Among the other services (or RAN slices, NW slices X, or AISs) that may be multiplexed in the grant for the service X (or RAN slice X, NW slice X, or AIS X), the order in which the other services (or RAN slices, NW slices X, or AISs) may be configured by the network. Service (or RAN slice, NW slice, or AIS) priority may be defined for such purpose. A grant may be allocated per service (or RAN slice, NW slice, or AIS).

The above-described LCP may be done by indicating (e.g., service type, RAN/NW slice ID, or AIS ID) along with the grant.

Alternatively, the UE may have different cell radio network temporary identifiers (C-RNTIs) for different services, and the grant may be signaled using a service-specific C-RNTI.

Alternatively, grant signaling may be performed in service-specific resources.

Alternatively, a logical channel identifier(s) or logical channel group(s) (LCGs), or data radio bearer identifiers (DRB IDs) may be indicated together with the grant.

Alternatively, a logical channel or DRB may be mapped to a particular PHY configuration (e.g., physical channel or resources or numerology). The grant may be separate per PHY configuration set. The UE may schedule logical channels or DRBs associated with the PHY configuration set in the allocated grant. The PHY configuration set may be signaled over the radio bearer.

In some embodiments, time/frequency resources may be partitioned. Where the UE receives a grant signaling within a particular partition (i.e., NR-PDCCH or new RAT-physical downlink control channel) or resources in the UL grant come from a particular partition, the UE may identify that the UL grant is for radio bearer(s) or service(s) associated with the partition. Mapping a radio bearer to a particular time/frequency resource partition or service may be signaled while configuring the radio bearer.

In some embodiments, the particular partition may include an indication of relevant service(s). Mapping a radio bearer to a service may be signaled while configuring the radio bearer.

In some embodiments, the particular partition may include information about the HARQ configuration and/or numerology used for the grant. Mapping a radio bearer to an HARQ configuration and/or numerology may be signaled while configuring the radio bearer.

In some embodiments, LCP may include two steps. Upon receiving a grant, logical channel(s) allocated for the grant may first be identified. Such identification may be done as set forth supra. Second, LCP may be applied over logical channels. Where resources remain, other logical channels may be scheduled as permitted.

Some of the logical channels or logical channel groups may be mapped to a particular carrier(s) or logical channels but may not be mapped to particular carriers. For example, low-latency traffic may not be mapped to high-frequency band (e.g., an ultra-high frequency band such as that of mmWave) or voice services may not be mapped to unlicensed bands of carriers. Such mapping information may be provided in RRC signaling by the eNB. Alternatively, RRC signaling may indicate carrier(s) not permitted for radio bearer/flow/logical channel transmission. Where grants are received for carriers, LCP may include (i.e., consider for LCP) only logical channels mapped to the carriers for which grants have been received. For LCP, MAC may be mapped to carriers for which grants have been received, and logical channels with data available for transmission may be taken into account. Alternatively, where grants are received for carriers, LCP may not include logical channels for which transmission is not permitted over the carriers for which grants have been received.

In some embodiments, different services may be supported over different carriers. One or more services may be supported over a single carrier. The network may signal services that are supported over the cell. Additively, the network may indicate carriers for which other services are supported, or the network may indicate services which are supported over neighbor cells. Such information may be used to discover and select a proper cell by the UE which is interested in a particular service.

Where multiple services are supported on a cell or carrier, the time/frequency domain for each service may be signaled differently. Such signaling may be broadcast or dedicated.

At least one PHY configuration among OFDM numerology, multiple access schemes (orthogonal or non-orthogonal) and resources may differ for different services. In some embodiments, the PHY configuration may be specific to radio bearer/flow/logical channel/RAN slice/NW slice/AIS.

System information may be categorized into common information and service-specific information. The common information may also be obtained by the UE supportive of some service(s) in the system. The service-specific information may be obtained by the UE for a particular service. In some embodiments, the common information may include scheduling information of the service-specific information. In some embodiments, the common information may be broadcast by the serving cell. In some embodiments, the service-specific information may be transmitted by one or more UEs using the particular service. In some embodiments, the service-specific information may be transmitted by one or more UEs that may use the particular service. In some embodiments, whether to transmit the service-specific information may be determined by the base station. In some embodiments, service particular information of other cells may be broadcast by the serving cell.

PDCP may always be present or absent. Whether PDCP is present or not may be configured on a radio bearer basis. Whether to apply a security algorithm or security may be configured on each radio bearer basis.

In some embodiments, the evolved NodeB (eNB) may indicate one or more of one or more logical channel IDs (LCIDs), one or more LCGs, one or more flow IDs, one or more DRB IDs, service type(s), RAN slice ID(s), NW slice ID(s), PHY slice ID, physical channel ID, resource type, resource partition ID, resource pool ID, MAC configuration ID, PHY configuration ID, HARQ configuration ID, MACK-PHY configuration ID, and PHY feature ID in UL grant signaling. These may be indicated using the information field in the UL grant information or by masking the CRC of the UL grant signaled by the C-RNTI specific to such parameters. For example, where service types are indicated, the UE may be allocated different C-RNTIs for different service types. A service-specific C-RNTI may be used in UL grant signaling to indicate a grant for a particular service.

Alternatively, UL grant signaling may be transmitted in a resource partition, resource pool, or subframe, and the resource partition, resource pool, or subframe may be mapped to one or more of the service type, RAN slice, PHY slice, PHY channel ID, MAC configuration ID, PHY configuration ID, HARQ configuration ID, MAC-PHY configuration ID, PHY feature ID, LCID, or LCG.

The logical channel, LCG, or DRB may be mapped to the service type, RAN slice, PHY slice, PHY channel ID, MAC configuration ID, PHY configuration ID, HARQ configuration ID, MAC-PHY configuration ID, PHY feature ID, LCID, LCG, resource partition, resource pool, or resource type. Such mapping may be done at the time of the logical channel, LCG, DRB, or flow. Mapping may be signaled by the UE or base station. Accordingly, after receiving the UL grant signaling, the UE may recognize one or more logical channels, DRBs, or flows that may be scheduled in the UL grant.

In some embodiments, a buffer status report (BSR) may report the buffer status of logical channels, LCGs, DRBs, or flows. The BSR may indicate at least one of relevant service type(s), RAN slice ID(s), NW slice ID(s), PHY slice ID, physical channel ID, resource type, resource partition ID, resource pool ID, MAC configuration ID, PHY configuration ID, HARQ configuration ID, PHY-MAC configuration ID, and PHY feature ID. In some embodiments, the BSR may report the integrated buffer status of one or more of the service type, RAN slice ID, NW slice ID, PHY slice ID, physical channel ID, resource type, resource partition ID, resource pool ID, MAC configuration ID, PHY configuration ID, HARQ configuration ID, PHY-MAC configuration ID, and PHY feature ID.

The radio resource control (RRC) layer in the UE and eNB may perform control functions, such as system information broadcasting, paging, access management, radio bearer configuration, mobility functions, UE measurement, and reporting. It may be inefficient for such functions to apply in the same manner regardless of service types or requirements for each service. In some embodiments, the RRC layer may be configured to be specific to services (e.g., eMBB, UR/LL, MTC, or massive connectivity). The functions performed by the RRC may differ for different services. For example, mobility functions may not be configured for services that do not require mobility resources. In case of connected mode operations, a handover may require LL and/or may not be supported for services that do not require service continuity. A connection reestablishment may be performed instead of handover.

A RRC state machine may differ for different services. For example, a mobile broadband RRC may have two states, i.e., idle and connected. However, for short data services, the RRC may not have the connected state. That is, data may be transmitted and/or received in the idle state. That is, it may not need the RRC connected state.

A RRC connection establishment procedure may differ for different services. For particular services, security may be performed by higher layers. In such case, there may be no need for signaling-related security during the connection establishment. In some embodiments, the UE may store connected mode context in the idle mode and use the same for a fast connection setup.

Only the UE may initiate traffic for some services. In such case, it may not need to support paging operations.

Similar to the RRC layer, the non-access stratum (NAS) layer may be configured service-specifically. The UE may retain and/or register service-specific security context. Where the UE supports multiple services, the UE may retain multiple security contexts. These may be registered independently in different mobility management entities (MMEs).

Different cells or eNBs may be configured for different services. Such cells or eNBs each may have different connectivity to the core network (CN) depending on service requirements. The UE may camp on the cell depending on service types supported by the UE. Where the UE supports multiple service types, the UE may camp on multiple cells and establish an RRC connection with a particular cell. Where multiple services are simultaneously activated, each UE may establish multiple RRC connections to a particular cell. Where the UE supports multiple service types, the UE may camp on the cell that supports all of the services or prioritize the cell.

In a non-roaming case, the UE may always camp on the home public land mobile network (HPLMN) cell, or in a roaming case, the UE may always camp on the visited PLMN (VPLMN) cell. In such case, if the UE does not roam and the quality of the HPLMN cell is not good, the UE cannot camp on the cells of different PLMNs. In some embodiments, the UE may be authenticated to camp on local PLMNs as well as the HPLMN, equivalent PLMN (EPLMN), and VPLMN. In such case, the UE may prioritize the selection of the local PLMN cell which is compared with the HPLMN to obtain a better service during cell selection. Where the HPLMN cell presents a good quality but does not support the service that the UE is interested in, if the local PLMN cell supports the service the UE is interested in, the UE may select the local PLMN cell.

Figure 3:
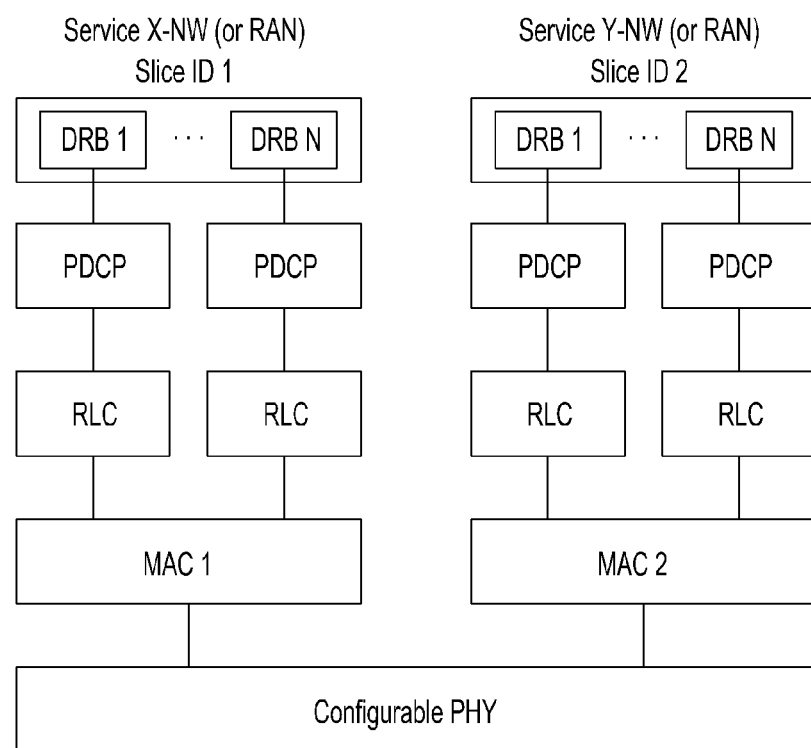
FIG. 3 illustrates an RAN protocol structure according to an embodiment of the present disclosure.

An RAN protocol of the present disclosure is described below with reference to FIG. 3. FIG. 3 illustrates an RAN protocol structure according to an embodiment of the present disclosure. A separate PDCP and RLC entity may exist for each DRB. The MAC entity may be service specific. There may be multiple DRBs associated with one service. The service may be identified using at least one of service ID, NW slice, RAN slice ID, or network entities (e.g., gateway, MME, or server), or other schemes indicated by the TCP/IP/application layer.

In some embodiments, there may be two types of MAC entities, i.e., control and non-control. The control MAC entity may perform functions such as random access and timing advance (TA) management. The non-control MAC entity may perform functions such as LCP, HARQ, and multiplexing. The non-control MAC entity may be service-specific. In some embodiments, the SR and BSR may be part of the non-control MAC entity in the cases where such functions are service-specific.

In some embodiments, two types of MAC entities, service-specific and service-agnostic, may exist. There may be one service-agnostic MAC entity per UE for each eNB. The service-agnostic MAC entity may perform functions which are common to all services or are not specific to any service. The service-specific MAC entity may perform service-specific functions. There may be one service-specific MAC entity per service. There may be one service-specific MAC entity per service for each eNB.

Figure 4:
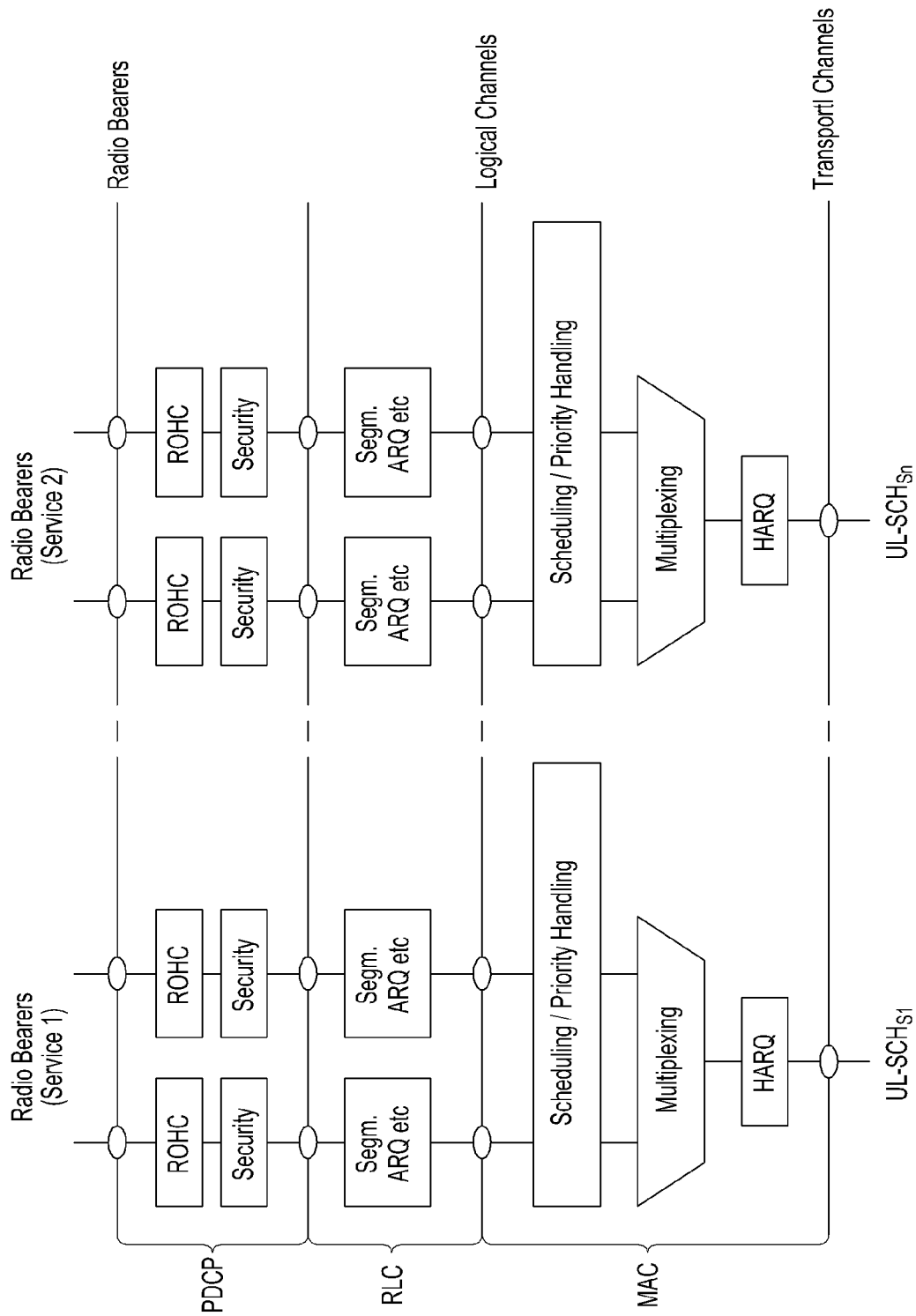
FIG. 4 illustrates an L2 structure in a UE according to an embodiment of the present disclosure.

Layer 2 (L2) of a UE of the present disclosure is described below with reference to FIG. 4. FIG. 4 illustrates an L2 structure in a UE according to an embodiment of the present disclosure. A separate MAC entity may be present for each service (or network slice or RAN slice). Transmission channels, HARQ entities, and scheduling entities may be separate for each service. However, where some parts of the services are correlated with each other, the separate MAC entities may cooperate with each other via a cooperation interface or shared functions. For example, where service 1 and service 2 are scheduled together, only the respective scheduling/priority processing parts of the entities may cooperate together. As another example, common scheduling/priority processing may be used in service 1 and service 2. The above principle may also apply to multiplexing or HARQ.

Figure 5:
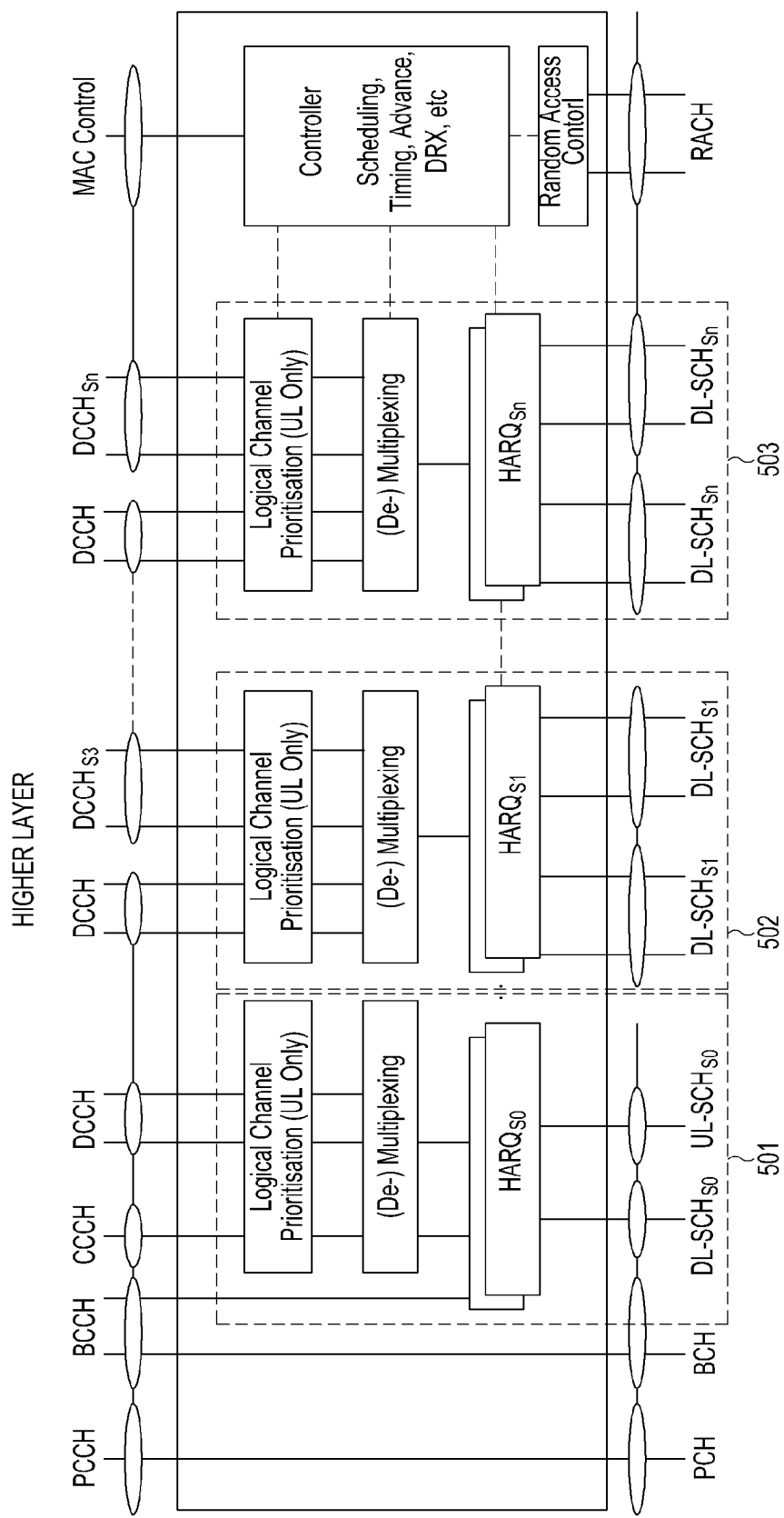
FIG. 5 illustrates an MAC structure in a UE according to an embodiment of the present disclosure.

An MAC structure in a UE is described below with reference to FIG. 5. FIG. 5 illustrates an MAC structure in a UE according to an embodiment of the present disclosure. The MAC structure in the UE may include a default MAC entity 501 and service-specific MAC entities 502 and 503. A dedicated control channel (DCCH) may be mapped to any MAC entity 501, 502, or 503. A common control channel (CCCH) may be mapped to the default MAC entity. Service-specific dedicated traffic channels $DTCH_{S1}$ and $DTCH_{S2}$ may be mapped to the service-specific MAC entities 502 and 503, respectively.

Figure 6:
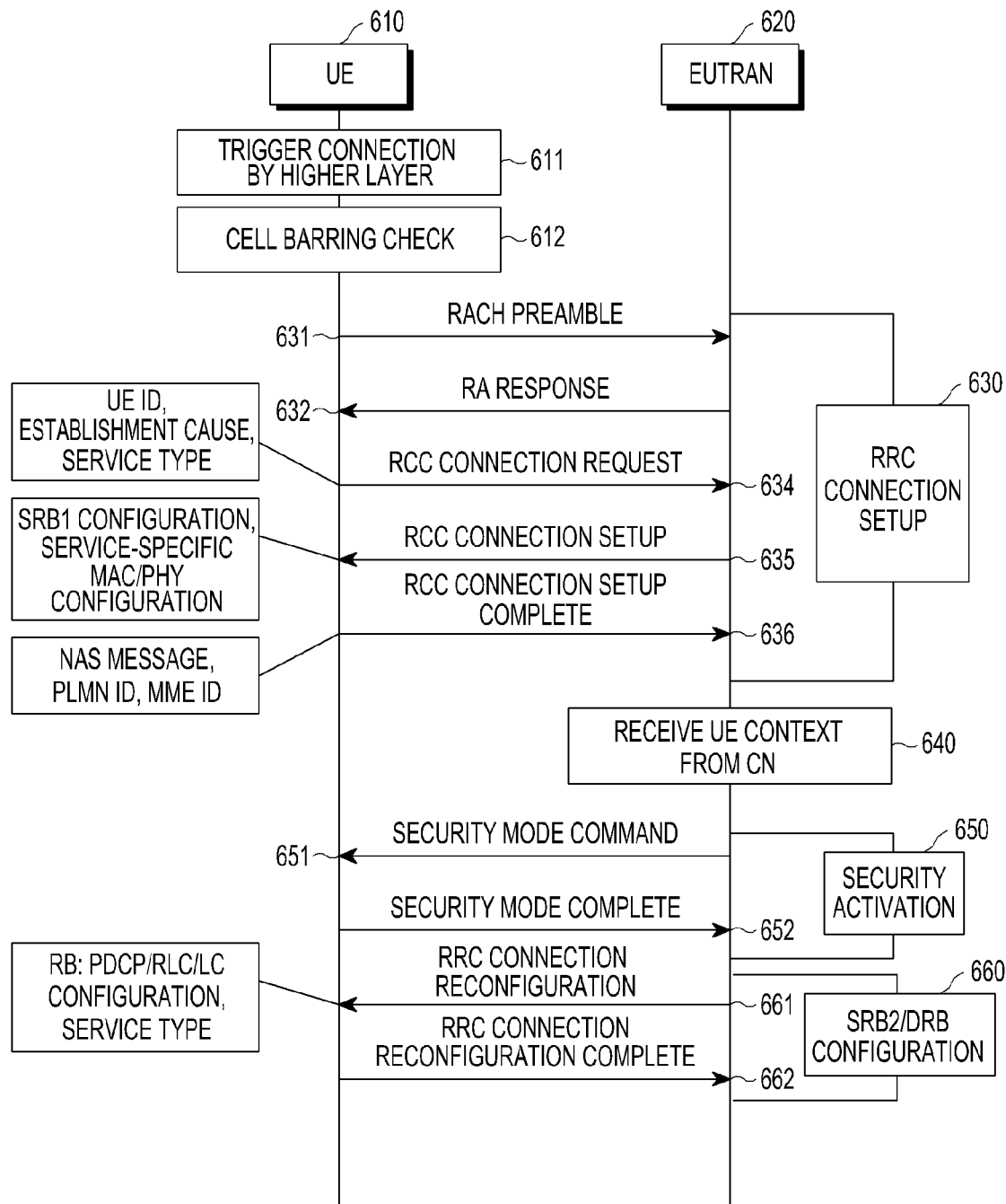
FIG. 6 is a flowchart illustrating signaling for setting up service-specific MAC/PHY configurations according to an embodiment of the present disclosure.

Signaling for setting up service-specific MAC/PHY configurations according to an embodiment of the present disclosure is described below with reference to FIG. 6. FIG. 6 is a flowchart illustrating signaling for setting up service-specific MAC/PHY configurations according to an embodiment of the present disclosure.

In step 611, a connection may be triggered for a UE 610 by a higher layer.

In step 612, the UE 610 may perform a cell barring check to identify whether the cell to which the UE 610 attempts to connect is a cell prohibited for connection.

Thereafter, a RRC connection establishment 630 may be performed. The RRC connection establishment 630 may include steps 631, 632, 634, 635, and 636.

In step 631, the UE may transmit a RACH preamble to an evolved UMTS terrestrial radio access network (EUTRAN) 620 (or network or eNB or base station).

In step 632, the EUTRAN 620 may transmit a random access (RA) response to the UE 610.

In step 634, the UE 610 may transmit an RRC connection request message to the EUTRAN 620. The RRC connection request message may include the type of a service (or RAN slice or NW slice) desired (requested or supported) by the UE 610, a connection establishment cause, and the ID of the UE 610.

In step 635, the EUTRAN 620 may transmit an RRC connection setup message to the UE 610. The RRC connection setup message may include a signaling radio bearer 1 (SRB1) configuration and service (or RAN slice or NW slice)—specific MAC/PHY configuration(s). The service-specific MAC/PHY configuration(s) may be related to the type(s) of service(s) of which the EUTRAN 620 has been notified in step 634.

In step 636, the UE 610 may transmit an RRC connection setup complete message to the EUTRAN 620. The RRC connection setup complete message may include at least one of a NAS message, a PLMN ID, and an MME ID.

Thereafter, in step 640, the EUTRAN 620 may receive a context for the UE 610 from the CN.

Then, a security activation step 650 may be performed. The security activation step 650 may include steps 651 and 652. In step 651, the EUTRAN 620 may transmit a security mode command to the UE 610. In step 652, the UE 610 may notify the EUTRAN 620 that the security mode has been complete.

Thereafter, configuring 660 an SRB2 and data ratio bearer (DRB) may be performed. Configuring 660 the SRB2 and DRB may include steps 661 and 662. In step 661, the EUTRAN 620 may transmit an RRC connection reconfiguration message to the UE 610. The RRC connection reconfiguration message may include PDCP, RLC, LC configurations (i.e., DRB configurations) and service types (or RAN/NW slice IDs/types) associated with the respective DRBs. Accordingly, the UE 610 may use a proper MAC/PHY configuration for the DRB. In step 662, the UE 610 may transmit an RRC connection reconfiguration complete message to the EUTRAN 620.

Figure 7:
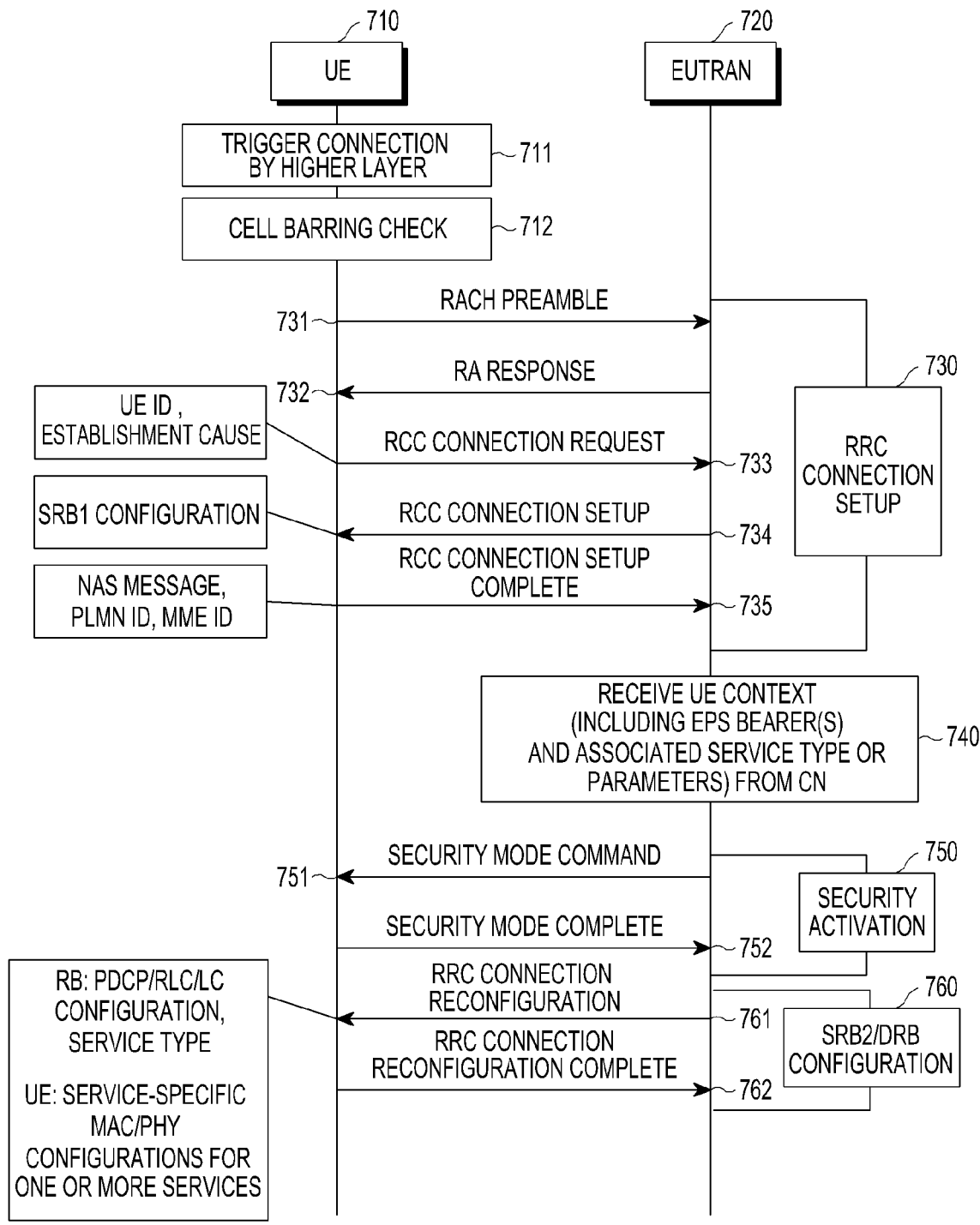
FIG. 7 is a flowchart illustrating signaling for setting up service-specific MAC/PHY configurations according to another embodiment of the present disclosure.

Signaling for setting up service-specific MAC/PHY configurations according to another embodiment of the present disclosure is described below with reference to FIG. 7. FIG. 7 is a flowchart illustrating signaling for setting up service-specific MAC/PHY configurations according to another embodiment of the present disclosure.

In step 711, a connection may be triggered for a UE 710 by a higher layer.

In step 712, the UE 710 may perform a cell barring check to identify whether the cell to which the UE 710 attempts to connect is a cell prohibited for connection.

After step 712 an RRC connection establishment 730 may be performed. The RRC connection establishment 730 may include steps 731, 732, 733, 734, and 735.

In step 731, the UE may transmit a RACH preamble to a EUTRAN 720 (or network or eNB or base station).

In step 732, the EUTRAN 720 may transmit an RA response to the UE 710.

In step 735, the UE 710 may transmit an RRC connection setup complete message to the EUTRAN 720. The RRC connection setup complete message may include at least one of a NAS message, a PLMN ID, and an MME ID.

In step 733, the UE 710 may transmit an RRC connection request message to the EUTRAN 720. The RRC connection request message may include a UE 710 ID and connection establishment cause.

In step 734, the EUTRAN 720 may transmit an RRC connection setup message to the UE 710. The RRC connection setup message may include an SRB1 configuration.

After step 735, the EUTRAN 720 may receive (740) a UE context from the CN. The UE context may include at least one of EPS bearer(s) and associated service (or RAN/NW slice) types o parameters. By receiving the UE context from the CN, the EUTRAN 720 may identify the type(s) of service(s) associated with the UE 710 or requested by the UE 710 and may provide the UE 710 with MAC/PHY configurations specific to the service (or RAN/NW slice) type through an RRC connection reconfiguration message as set forth below.

Then, a security activation step 750 may be performed. The security activation step 750 may include steps 751 and 752. In step 751, the EUTRAN 720 may transmit a security mode command to the UE 710. In step 752, the UE 710 may notify the EUTRAN 720 that the security mode has been complete.

Thereafter, configuring (760) an SRB2 and DRB may be performed. Configuring 760 the SRB2 and DRB may include steps 761 and 762. In step 761, the EUTRAN 720 may transmit an RRC connection reconfiguration message to the UE 710. The RRC connection reconfiguration message may include a DRB configuration including a PDCP/RLC/LC configuration corresponding to each of the service types and a service-specific MAC/PHY configuration for one or more services for the UE. This is described in greater detail with reference to FIG. 8 which illustrates information indicating the MAC/PHY configuration for each DRB according to another embodiment of the present disclosure. Referring to FIG. 8, the RRC connection reconfiguration message may include information indicating the service type associated with each of the DRBs as in block 810, information indicating the MAC configuration specific to each of the service types as in block 820, and information indicating the PHY configuration specific to each of the service types as in block 830. Accordingly, the UE 710 may use a proper MAC/PHY configuration for the DRB. Referring back to FIG. 7, in step 762, the UE 710 may transmit an RRC connection reconfiguration complete message to the EUTRAN 720.

Figure 9:
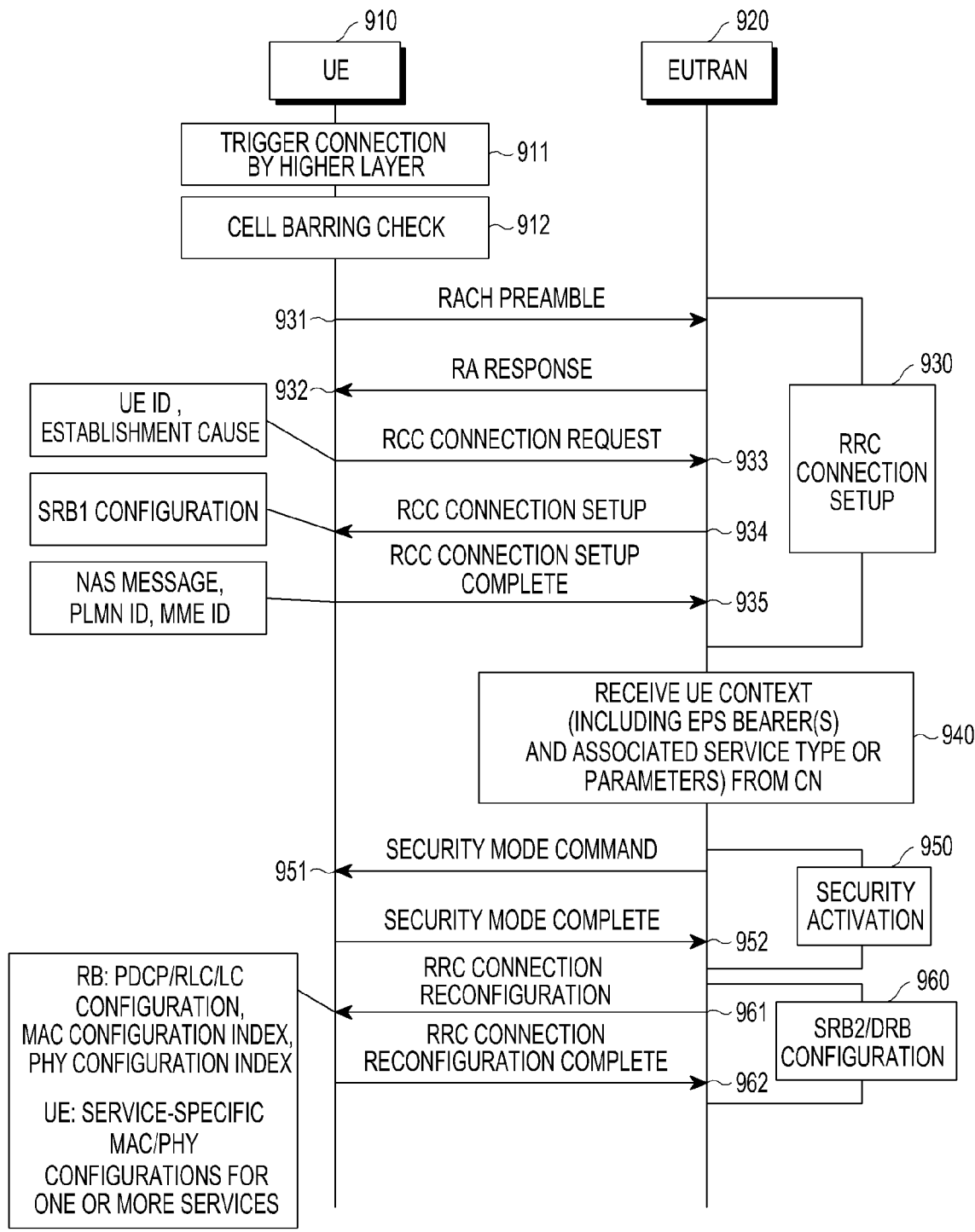
FIG. 9 is a flowchart illustrating signaling for setting up service-specific MAC/PHY configurations according to another embodiment of the present disclosure.

Signaling for setting up service-specific MAC/PHY configurations according to another embodiment of the present disclosure is described below with reference to FIG. 9. FIG. 9 is a flowchart illustrating signaling for setting up service-specific MAC/PHY configurations according to another embodiment of the present disclosure.

In step 911, a connection may be triggered for a UE 910 by a higher layer.

In step 912, the UE 910 may perform a cell barring check to identify whether the cell to which the UE 910 attempts to connect is a cell prohibited for connection.

After step 912 an RRC connection establishment 930 may be performed. The RRC connection establishment 930 may includes steps 931, 932, 933, 934, and 935.

In step 931, the UE may transmit a RACH preamble to a EUTRAN 620 (or network or eNB or base station).

In step 932, the EUTRAN 920 may transmit an RA response to the UE 910.

In step 933, the UE 910 may transmit an RRC connection request message to the EUTRAN 920. The RRC connection request message may include a UE 910 ID and connection establishment cause.

In step 934, the EUTRAN 920 may transmit an RRC connection setup message to the UE 910. The RRC connection setup message may include an SRB1 configuration.

In step 935, the UE 910 may transmit an RRC connection setup complete message to the EUTRAN 920. The RRC connection setup complete message may include at least one of a NAS message, a PLMN ID, and an MME ID.

After step 935, the EUTRAN 920 may receive (940) a UE context from the CN. The UE context may include at least one of EPS bearer(s) and associated service (or RAN/NW slice) types o parameters. By receiving the UE context from the CN, the EUTRAN 920 may identify the type(s) of service(s) associated with the UE 910 or requested by the UE 910 and may provide the UE 910 with MAC/PHY configurations specific to the service (or RAN/NW slice) type through an RRC connection reconfiguration message as set forth below.

After step 935, the EUTRAN 920 may receive (940) a UE context from the CN. The UE context may include at least one of EPS bearer(s) and associated service (or RAN/NW slice) types o parameters. By receiving the UE context from the CN, the EUTRAN 920 may identify the type(s) of service(s) associated with the UE 910 or requested by the UE 910 and may provide the UE 910 with MAC/PHY configurations specific to the service (or RAN/NW slice) type through an RRC connection reconfiguration message as set forth below.

Then, a security activation step 950 may be performed. The security activation step 950 may include steps 951 and 952. In step 951, the EUTRAN 920 may transmit a security mode command to the UE 910. In step 952, the UE 910 may notify the EUTRAN 920 that the security mode has been complete.

Figure 10:
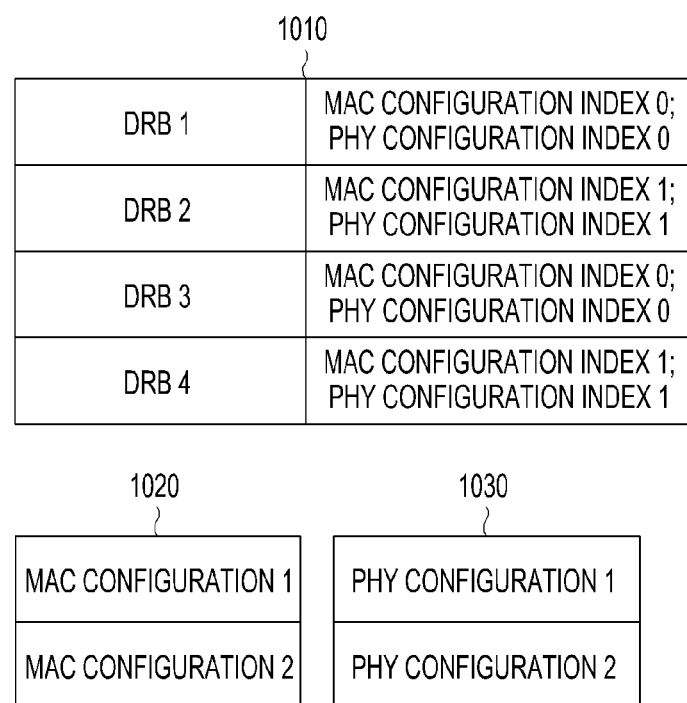
FIG. 10 illustrates information indicating MAC/PHY configurations for each DRB according to another embodiment of the present disclosure.

Thereafter, configuring (960) an SRB2 and DRB may be performed. Configuring 960 the SRB2 and DRB may include steps 961 and 962. In step 961, the EUTRAN 920 may transmit an RRC connection reconfiguration message to the UE 910. The RRC connection reconfiguration message may include DRB configuration(s) including PDCP/RLC/LC configuration(s) and an MAC configuration index and PHY configuration index corresponding to each DRB. The RRC connection reconfiguration message may also include an MAC configuration indicated by the MAC configuration index and a PHY configuration indicated by the PHY configuration index. This is described in greater detail with reference to FIG. 10 which illustrates information indicating the MAC/PHY configuration for each DRB according to another embodiment of the present disclosure. Referring to FIG. 10, the RRC connection reconfiguration message may include at least one of information indicating the MAC configuration index and PHY configuration index associated with each of the DRBs as in block 1010, MAC configurations identified by the MAC configuration index as in block 1020, and PHY configurations identified by the PHY configuration index as in block 1030. Referring back to FIG. 9, in the embodiment of FIG. 9, although the EUTRAN 920 fails to adequately provide the information about the service type related to each DRB to the UE 910, the UE 910 may use a proper MAC/PHY configuration according to the DRB. In some embodiments, one-to-one mapping may be achieved between MAC/PHY configuration and NW/RAN slice. Alternatively, multiple network/RAN slices may also be mapped to the same MAC/PHY configuration. In step 962, the UE 910 may transmit an RRC connection reconfiguration complete message to the EUTRAN 620.

All services may not be provided over all carrier frequencies. For instance, an eMBB service is supported on an F1 carrier whereas a massive MTC (mMTC) service or critical MTC service may not over the F1 and the mMTC service may over an F2 carrier. As another example, public safety (PS) services may be supported over a dedicated frequency for PS operations. Where a particular service is supported over a particular frequency, the service may be supported over all of the cells of the frequency.

The UE may select an appropriate cell supportive of the particular service, a technical feature/function necessary for the service, or a technical feature/function that the UE is interested in. The cell may broadcast service(s) it supports, technical features/functions necessary for each supported service, or technical features/functions it supports. The cell may also broadcast information about neighbor frequency(ies) and technical features/functions supported by each neighbor frequency, and technical features/functions necessary for each service supported by each neighbor frequency. During cell reselection, the UE may prioritize the carrier frequency that supports services the UE is interested in, technical features/functions necessary for each supported service, or technical features/functions the UE is interested in.

Where the UE is interested in multiple services or technical features/functions, the UE may select the cell that supports all the services the UE is interested in, all technical features/functions necessary for each supported service, or all technical features/functions the UE is interested in. Alternatively, the UE may select the cell that supports at least one service the UE is interested in, at least one technical feature/function necessary for service, or at least one technical feature/function the UE is interested in. Alternatively, the UE may select multiple cells that each support one or more services the UE is interested in, one or more technical features/functions for service, or one or more technical features/functions the UE is interested in.

The UE may select an appropriate cell that supports the service the UE is interested in, technical features/functions necessary for service, or technical features/functions the UE is interested in. Upon discovering multiple cells that support, on a single frequency, the service the UE is interested in, technical features/functions necessary for service, or technical feature/function the UE is interested in, the UE may (re)select the cell with the best cell quality. The appropriate cell set forth above may mean a cell whose signal quality is a threshold or more and which is not barred and belongs to the selected (E)PLMN.

The cell may broadcast service(s) it supports, technical features/functions necessary for each supported service, or technical features/functions it supports. The cell may broadcast service(s) neighbor frequencies support, technical features/functions necessary for each supported service, or technical features/functions neighbor frequencies support.

The UE may prioritize the service the UE is interested in for cell (re)selection, technical features/functions for each supported service, or technical features/functions the technical UE is interested in for cell (re)selection. Where there are multiple frequencies supporting the service the UE is interested in, technical features/functions for each supported service, or technical features/functions the technical UE is interested in, the UE may prioritize reselection of the frequency of a higher priority.

The UE may perform inter-radio access technology (RAT) (inter RAT) cell reselection. Cells (e.g., 5G cells) according to embodiments of the present disclosure may coexist with conventional LTE cells. Cells as per embodiments of the present disclosure may support, or not support, all of the services supported by LTE cells. Cells, as per embodiments of the present disclosure, along with LTE cells, may provide various services over an operator's network. For example, at least one service of D2D discovery, D2D communication, and MBMS may be provided through LTE cells, and eMBB or UR/LL services may be supported by cells as per embodiments of the present disclosure. Where the UE camps on the cell with higher priority, as per embodiments of the present disclosure, and is interested in the service (or technical features/functions for each supported service) which is supported by LTE cells with lower priority but not supported by cells as per embodiments of the present disclosure, the UE may obtain its desired service by performing inter-RAT cell reselection and prioritizing the lower-priority RAT. The UE, which camps on the cell with higher priority, as per embodiments of the present disclosure, and is interested in the service that is not supported by cells as per embodiments of the present disclosure but is supported by other lower-priority RAT (e.g., LTE) cells, may perform inter-RAT cell reselection to the lower-priority LTE cell.

In some embodiments, a single carrier frequency may support multiple services. The priority of a carrier frequency may differ for services and may be signaled. For example, where an F1 carrier supports service 1 and service 2, the F1 carrier may have a priority P1 for service 1 and a priority P2 for service 2. The priorities corresponding to supported service(s) for a single carrier frequency may be signaled. For example, based on the service the UE is interested in, the priority of the carrier frequency corresponding to the service may be used by the UE to prioritize the carrier frequency during cell selection or reselection.

Figure 11:
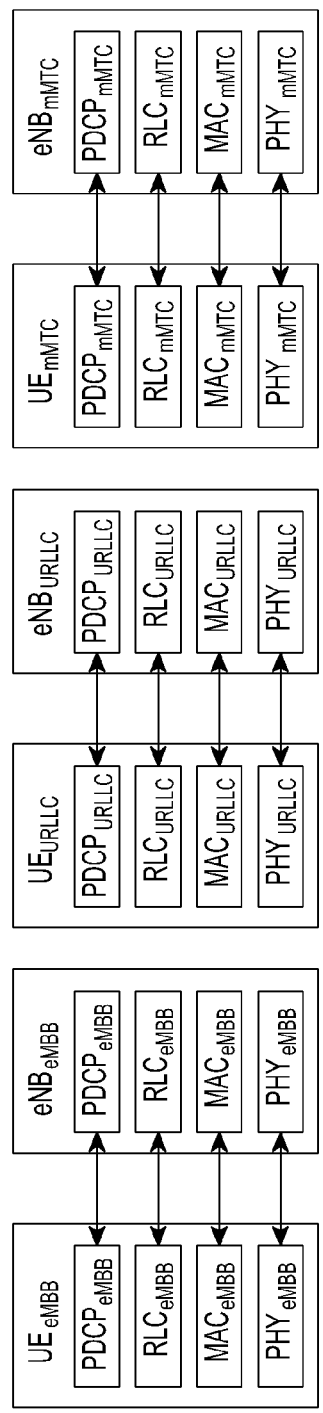
FIG. 11 illustrates a straightforward design of an NR user plane according to an embodiment of the present disclosure.

Now described is new RAT (NR) L2 optimization for vertical services (e.g., eMBB, URLL, mMTC, or other services). Where the user plane is ideally optimized for a particular vertical service or use case, a straightforward design of the NR user plane is as shown in FIG. 11. FIG. 11 illustrates a straightforward design of an NR user plane according to an embodiment of the present disclosure.

Referring to FIG. 11, where the NR-node B or NR-UE supports only one (e.g., mMTC) of verticals, the PDCP/RLC/MAC/PHY configuration should be optimized for the mMTC use case. However, where the NR-node B or NR-UE supports multiple verticals (e.g., eMBB and URLL communications (URLLC)), the RRC should properly configure PDCP/RLC/MAC/PHY depending on the traffic type associated with a particular vertical service. PHY configurations (e.g., OFDM numerology or multiple access schemes (orthogonal or non-orthogonal)d may differ for particular verticals within the same frequency range.

To support various vertical services, a relation between DRB and vertical service, a relation between MAC configuration and vertical service, and a relation between PHY configuration and vertical service may be at issue.

Regarding the relation between DRB and vertical service, one-to-one mapping between service and DRB may be carried out. That is, a particular service (e.g., eMBB, URLLC, or mMTC) may have a single DRB configuration. Alternatively, one-to-N mapping may be performed between a service and DRBs. That is, a particular service may have multiple DRB configurations.

In some embodiments, regarding the relation between MAC configuration and vertical service, one-to-one mapping may be performed between service and MAC configuration. That is, a particular service may have a single MAC configuration. Alternatively, one-to-N mapping may be done between a service and MAC configurations. That is, a particular service may have multiple MAC configurations.

Regarding the relation between PHY configuration and vertical service, one-to-one mapping may be performed between service and PHY configuration. That is, a particular service may have a single PHY configuration. Alternatively, one-to-N mapping may be performed between a service and PHY configurations. That is, a particular service may have multiple PHY configurations.

MAC configurations of the NR user plane are described below with reference to FIGS. 12 to 14, according to embodiments of the present disclosure.

Figure 12:
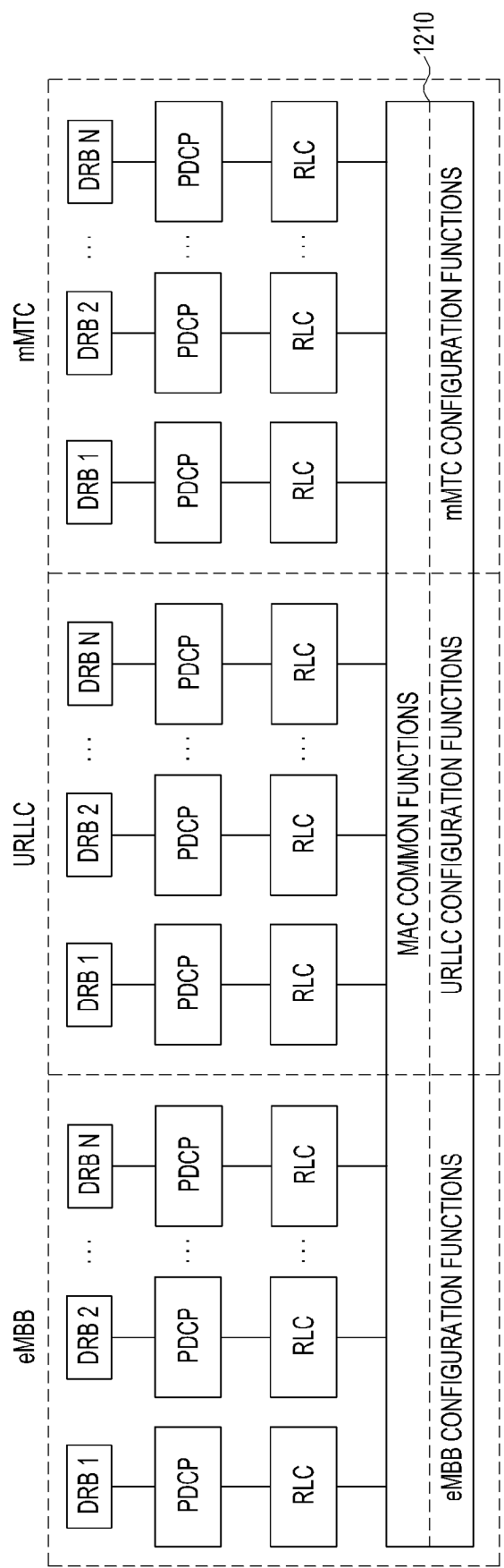
FIG. 12 illustrates a design of an NR user plane according to an embodiment of the present disclosure.

FIG. 12 illustrates a design of an NR user plane according to an embodiment of the present disclosure. Referring to FIG. 12, a single MAC entity 1210 may be implemented which has multiple MAC configurations each of which is associated with a vertical service. For example, the single MAC entity 1210 may include a configuration including MAC common functions. For example, the single MAC entity 1210 may include configurations including functions configured for each service (eMBB, URLLC, or mMTC). In some embodiments, the configuration including the MAC common functions may be agnostic or transparent to the service in which the UE operates.

Figure 13:
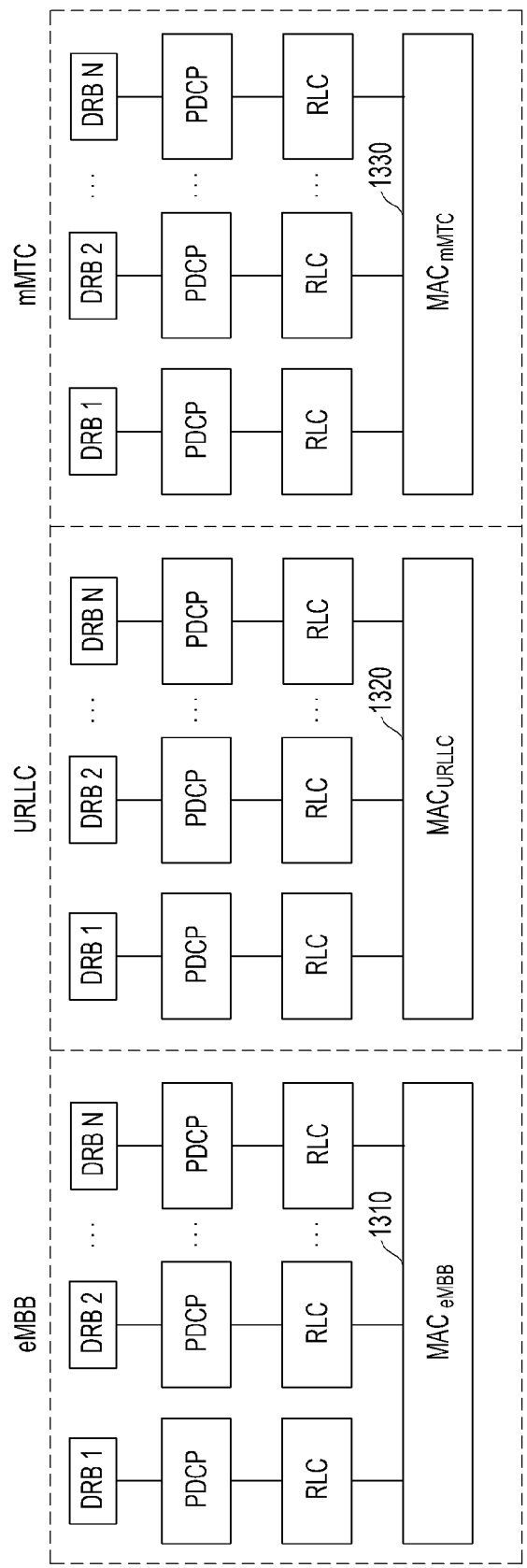
FIG. 13 illustrates a design of an NR user plane according to another embodiment of the present disclosure.

FIG. 13 illustrates a design of an NR user plane according to another embodiment of the present disclosure. Referring to FIG. 13, there may be implemented multiple MAC entities 1310, 1320, and 1330 each associated with a respective of vertical services. For example, there may be separately configured an MAC entity 1310 associated with an eMBB service, an MAC entity 1320 associated with a URLLC service, and an MAC entity 1330 associated with an mMTC service. Also in the case where multiple MAC entities are separately configured, each MAC entity may cooperate with another via an interface between the MAC entities.

Figure 14:
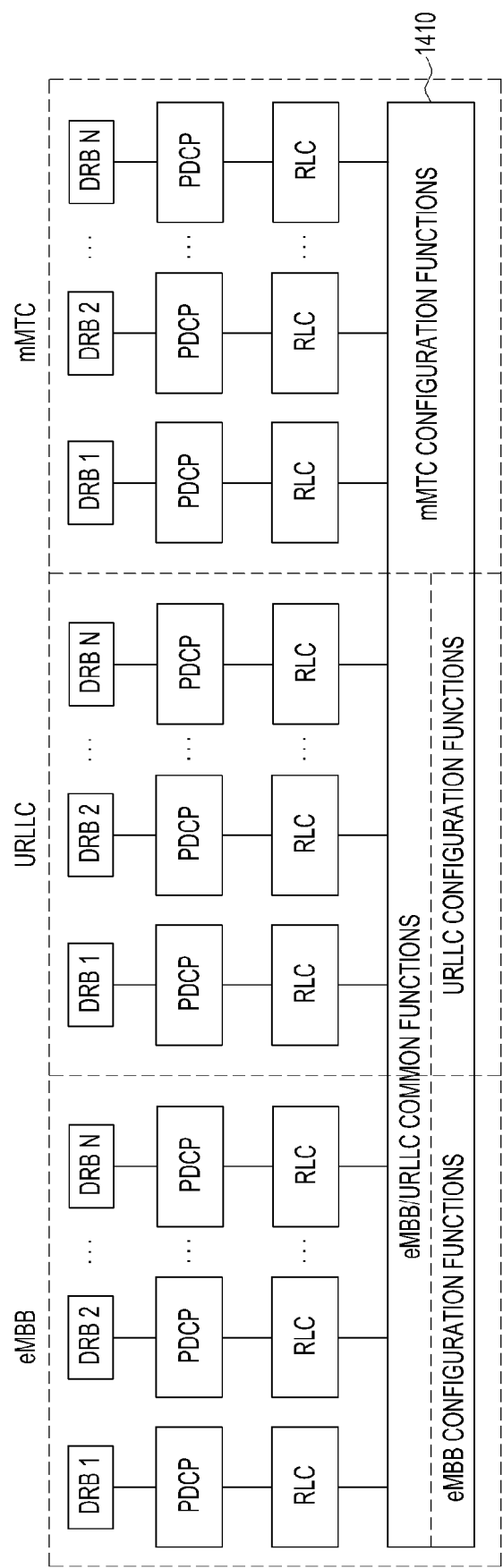
FIG. 14 illustrates a design of an NR user plane according to another embodiment of the present disclosure.

FIG. 14 illustrates a design of an NR user plane according to another embodiment of the present disclosure. Referring to FIG. 14, one MAC entity 1410 (not all) may be configured of functions associated with multiple vertical services and functions associated with a single vertical service. For example, the MAC entity 1410 may include a configuration including functions common to an eMBB service and a URLLC service, a configuration including functions configured only for the eMBB service, a configuration including functions configured only for the URLLC service, and a configuration including functions configured only for the mMTC service. Some functions in the single MAC entity may be common to two or more services but not to all of the services. In FIG. 14, the eMBB service and URLLC services may share the same physical resource pool, the mMTC may share separate physical resource pools, and the MAC functions such as scheduling, prioritization handling, and logical channel prioritization may be common to the eMBB and URLLC services whereas the mMTC service may require separate scheduling.

Figure 15:
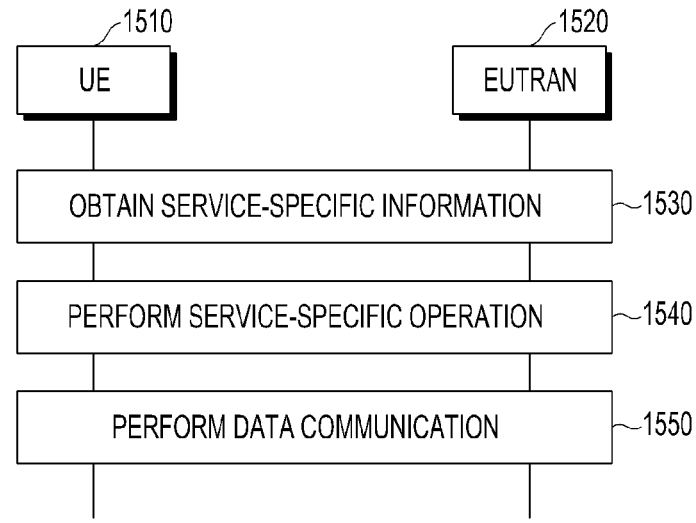
FIG. 15 is a flowchart illustrating a change in procedure before or after obtaining service-specific configuration information from a network according to an embodiment of the present disclosure.

FIG. 15 is a flowchart illustrating a change in procedure before or after obtaining service-specific configuration information from a network according to an embodiment of the present disclosure. Referring to FIG. 15, in step 1530, the UE 1510 may obtain MAC/PHY configuration information associated with a particular service through at least one of system information, initial access or re-establishment, RRC connection setup or RRC reconfiguration. Thereafter, in step 1540, the UE 1510 may perform a service-specific operation. For example, where the UE obtains the service-specific information from the system information, the UE, after downlink (DL) synchronization, may initiate a service-specific random access procedure according to the service type. The service-specific random access procedure may be either contention-based or non-contention-based depending on services. In the service-specific random access procedure, at least one of random access preamble ID, random access preamble transmission resource, and random access preamble transmission beam may be selected depending on services and may be applied differently per service. As another example, where the UE transmits and receives data, a different HARQ procedure associated with the particular service may be carried out. As another example, the UE may perform a different scheduling request or buffer status reporting procedure associated with the particular service. As another example, the UE may apply a different DRX procedure associated with the particular service. Accordingly, all relevant radio protocol procedures related to the particular service may be rendered to differ after obtaining the service-specific configuration information. However, before obtaining the service information, all the radio protocol procedures should follow the service-agnostic (common or default) procedure. Even after obtaining the service-specific configuration information, some procedures, such as idle mode operations, may be service-agnostic procedures. The operation 1550 of performing data communication between the UE 1510 and the EUTRAN 1520 may be carried out according to the service-specific configuration information obtained.

Figure 16:
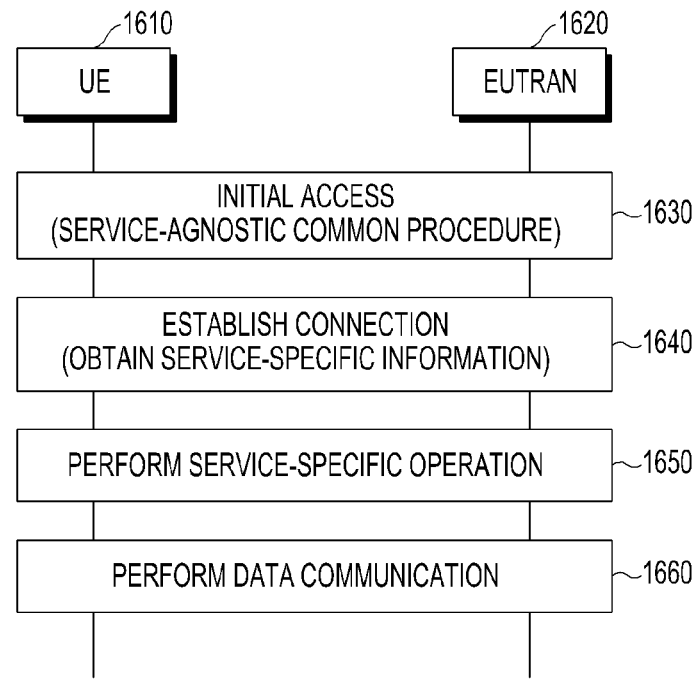
FIG. 16 is a flowchart illustrating a change in procedure before or after obtaining service-specific configuration information from a network according to another embodiment of the present disclosure.

FIG. 16 is a flowchart illustrating a change in procedure before or after obtaining service-specific configuration information from a network according to another embodiment of the present disclosure. Referring to FIG. 16, the UE 1610 may perform (1630) initial access which is a procedure common to the EUTRAN 1620. The UE 1610 may establish (1640) a connection for the EUTRAN 1620 and may obtain service-specific information through an RRC connection setup message or RRC connection reconfiguration message while establishing the connection. Thereafter, a service-specific operation may be performed (1650) and data communication may be performed (1660) based on the obtained service-specific information.

Figure 17:
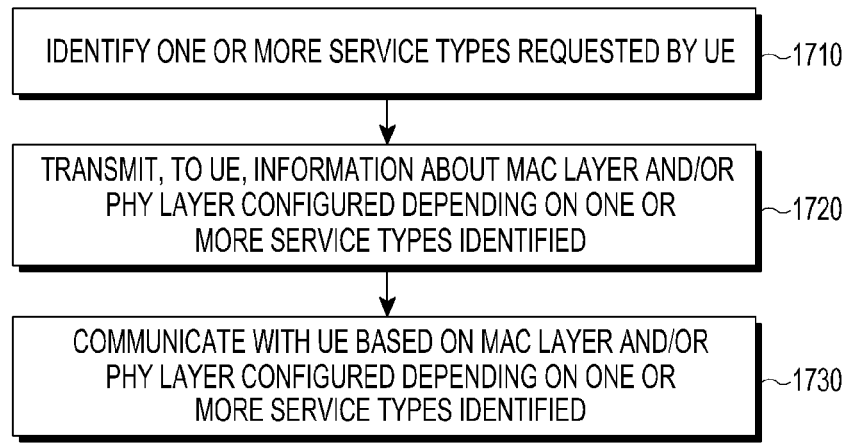
FIG. 17 is a flowchart illustrating operations of a base station according to an embodiment of the present disclosure.

Now described are operations of a base station (or network) with reference to FIG. 17 according to an embodiment of the present disclosure. FIG. 17 is a flowchart illustrating operations of a base station according to an embodiment of the present disclosure.

The base station may identify types of one or more services that a UE requests (or is interested in) in step 1710. The UE may notify the base station of the service types or the service types may be obtained from the CN.

The base station may transmit, to the UE, information about the MAC layer and/or PHY layer configured depending on one or more service types identified, in step 1720. Step 1720 may be performed by notifying of one or more DRBs and service type related to each of the one or more DRBs and the configuration of the MAC layer and/or PHY layer related to one or more service types. Alternatively, step 1720 may be performed by notifying the UE of one or more DRBs associated with one or more services and the MAC configuration index and/or PHY configuration index for the one or more DRBs, and MAC layer configurations consistent with MAC configuration indexes and/or PHY layer configurations consistent with PHY configuration indexes.

The base station may communicate with the UE based on the MAC layer and/or PHY layer configured depending on one or more service types identified, in step 1730. The communication of step 1730 may include not only data communication but communication on the MAC layer as well.

Figure 18:
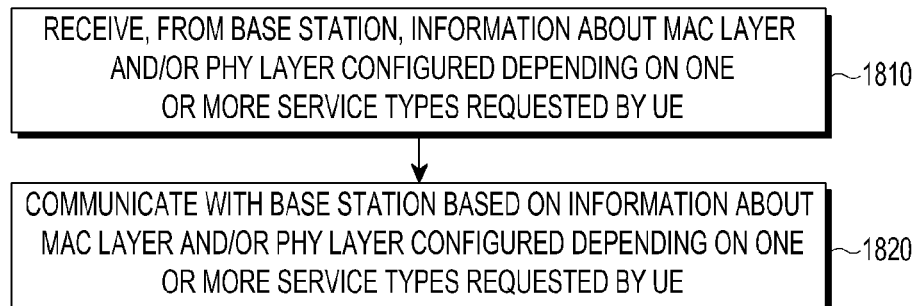
FIG. 18 is a flowchart illustrating operations of a UE according to an embodiment of the present disclosure.

Now described are operations of a UE with reference to FIG. 18 according to an embodiment of the present disclosure. FIG. 18 is a flowchart illustrating operations of a UE according to an embodiment of the present disclosure.

A UE may receive, from a base station, information about the configuration of the MAC layer and/or PHY layer configured depending on one or more service types requested by the UE in step 1810.

A UE may communicate with the base station based on the information about the configuration of the MAC layer and/or PHY layer configured depending on one or more service types requested by the UE, in step 1820.

A base station according to an embodiment of the present disclosure is described below with reference to FIG. 19.

Figure 19:
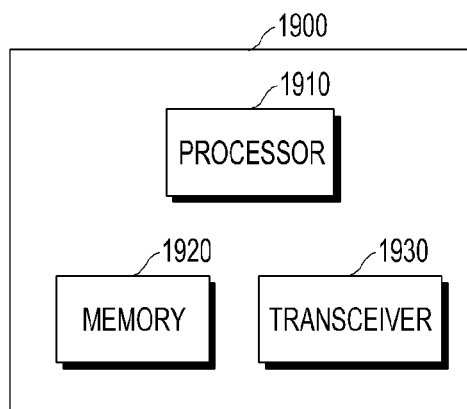
FIG. 19 is a block diagram illustrating a base station according to an embodiment of the present disclosure.

FIG. 19 is a block diagram illustrating a base station according to an embodiment of the present disclosure. Referring to FIG. 19, a base station may include a processor 1910, a memory 1920, and a transceiver 1930. The base station 1900 may be configured to operate the above-described operations of the base station. The processor 1910 may be communicably and electrically connected with the memory 1920 and the transceiver 1930. The base station 1900 may transmit and receive signals and communicate with other entities through the transceiver 1930. The memory 1920 may store pieces of information for operations of the base station 1900. The memory 1920 may store commands or codes for controlling the processor 1910. The processor 1910 may be configured to control the operation of the base station 1900. The above-described operations of the base station 1900 may be processed and run substantially by the processor 1910. Although transmission or reception of signals is performed through the transceiver 1930, and storage of data and commands is carried out by the memory 1920, the operations of the transceiver 1930 and the memory 1920 may be controlled by the processor 1910, and thus, transmission and reception of signals and storage of data and commands may also be deemed to be performed by the processor 1910.

The description of the components of the UE according to an embodiment of the present disclosure is substantially the same as the description of the components of the base station 1900 in connection with FIG. 19.

It may be further appreciated by one of ordinary skill in the art that various exemplary logic blocks, modules, circuits, methods, and algorithms described in connection with embodiments described herein may be implemented in hardware, computer software, or a combination thereof. In order to clarify interchangeability between hardware and software, various exemplary components, blocks, modules, circuits, methods, and algorithms have been generally described in light of their functionality. Whether such functionality is implemented in hardware or software relies on a particular application and design limitations given to the overall system. The disclosed functionality may be embodied in various manners on each particular application by one of ordinary skill in the art, but such determination should not be interpreted as causing departure from the category of the present disclosure.

Various exemplary logic blocks, modules, and circuits described herein in embodiments the present disclosure may be implemented or performed by a general-purpose processor, digital signal processor (DSP), application specific integrated circuit (ASIC), field programmable gate array (FPGA) or other programmable logic device, discrete gate or transistor logic, discrete hardware components, or their combinations designed to carry out the functions disclosed herein. The general-purpose processor may be a microprocessor. Alternatively, the processor may be a common processor, controller, microcontroller, or state machine. Further, the processor may be implemented in a combination of computing devices, e.g., a combination of a DSP and a microprocessor, multiple microprocessors, one or more microprocessors integrated with a DSP core, or any other configurations.

The methods and algorithms described in connection with embodiments described herein may be directly implemented in hardware, a software module run by the processor, or in a combination thereof. The software module may reside in a random access memory (RAM), flash memory, read only memory (ROM), erasable programmable ROM (EPROM), electrically erasable programmable ROM (EEPROM), registers, hard disk, removable disk, compact disc ROM (CD-ROM) or any other type of storage medium known in the art. The storage medium may be combined with the processor so that the processor reads information out of the storage medium and record information in the storage medium. Alternatively, the storage medium may be integrated with the processor. The processor and storage medium may reside in an ASIC.

In one or more exemplary embodiments, the above-described functions may be implemented in hardware, software, firmware, or any combination thereof. When implemented in software, the functions may be stored as one or more instructions or codes in a computer readable medium or transmitted through the same. The computer readable medium includes both a communication medium and computer storage medium including any medium facilitating to transfer a computer program from one place to another. The storage medium may be any available medium accessible by a general-purpose or special-purpose computer. As a non-limiting example, such computer readable medium may include a RAM, ROM, EEPROM, CD-ROM or other optical disc storage, magnetic disk storage or other magnetic storage devices, or any other medium available for transferring or storing program code means in a desired form of instructions or data structures and accessible by a general-purpose or special-purpose computer or special-purpose processor. Further, the access means is properly denoted the computer readable medium. For example, when the software is transmitted from a website, server, or other remote source using a coaxial cable, optical fiber cable, twisted pair, digital subscriber line (DSL), or infrared (IR) rays, or wireless techniques using wireless and microwaves, the coaxial cable, optical fiber cable, twisted pair, DSL, IR rays, and wireless techniques using wireless and microwaves belong to the definition of the medium. As used herein, the term "disk" or "disc" encompasses compact disc (CD), laser disc, optical disc, digital versatile disc (DVD), floppy disk, and Blu-ray disc, and here, the disk reproduces data generally magnetically while the disc reproduces data optically using laser beams. Combinations of those described above should be included in the computer readable medium.

Although embodiments of the present disclosure have been described with reference to the accompanying drawings, it will be appreciated by one of ordinary skill in the art that the present disclosure may be implemented in other various specific forms without changing the essence or technical spirit of the present disclosure. Thus, it should be noted that the above-described embodiments are provided as examples and should not be interpreted as limiting.

The invention claimed is:

1. A method performed by a user equipment (UE), the method comprising:
 receiving, from a base station, a radio resource control (RRC) message including logical channel configuration information, wherein the logical channel configuration information includes information related to an orthogonal frequency division multiplexing (OFDM) numerology; and
 selecting one or more logical channels for an uplink grant based on the logical channel configuration information, wherein the uplink grant is associated with the information related to the OFDM numerology.

2. The method of claim 1, wherein a logical channel prioritization (LCP) is performed based on the logical channel configuration information.

3. The method of claim 1, wherein the one or more logical channels include a logical channel that is mapped to a carrier for which an uplink grant is received.

4. A method performed by a base station, the method comprising:
 transmitting, to a user equipment (UE), a radio resource control (RRC) message including logical channel configuration information, wherein the logical channel configuration information includes information related to an orthogonal frequency division multiplexing (OFDM) numerology,
 communicating with the UE based on one or more logical channels for an uplink grant,
 wherein the one or more logical channels for an uplink is associated with the logical channel configuration information, and
 wherein the uplink grant is associated with the information related to the OFDM numerology.

5. The method of claim 4, wherein a logical channel prioritization (LCP) is performed based on the logical channel configuration information.

6. The method of claim 4, wherein the one or more logical channels include a logical channel mapped to a carrier for which an uplink grant is received.

7. A user equipment (UE), comprising:
 at least one transceiver; and
 at least one processor operably coupled to the at least one transceiver, and configured to:
  receive, from a base station, a radio resource control (RRC) message including logical channel configuration information via the at least one transceiver, wherein the logical channel configuration information includes information related to an orthogonal frequency division multiplexing (OFDM) numerology, and
  select one or more logical channels for an uplink grant based on the logical channel configuration information,
 wherein the uplink grant is associated with the information related to the OFDM numerology.

8. The UE of claim 7, wherein a logical channel prioritization (LCP) is performed based on the logical channel configuration information.

9. The UE of claim 7, wherein the one or more logical channels include a logical channel mapped to a carrier for which an uplink grant is received.

10. A base station, comprising:
 at least one transceiver; and
 at least one processor operably coupled to the at least one transceiver, and configured to:
  transmit, to a user equipment (UE), a radio resource control (RRC) message including logical channel configuration information via the at least one transceiver, wherein the logical channel configuration information includes information related to an orthogonal frequency division multiplexing (OFDM) numerology, and
  communicate with the UE based on one or more logical channels for an uplink grant,
 wherein the one or more logical channels for an uplink is associated with the logical channel configuration information, and
 wherein the uplink grant is associated with the information related to the OFDM numerology.

11. The base station of claim 10, wherein a logical channel prioritization (LCP) is performed based on the logical channel configuration information.

12. The base station of claim 10, wherein the one or more logical channels include a logical channel mapped to a carrier for which an uplink grant is received.

13. The method of claim 1, wherein the selecting of the one or more logical channels comprises:
    obtaining physical (PHY) information of the uplink grant, the PHY information corresponding to the information related to the OFDM numerology, and
    selecting one of the one or more logical channels that is associated with the PHY information.

14. The method of claim 1,
    wherein the RRC message is an RRC connection reconfiguration message or an RRC setup message, and
    wherein the RRC message further includes an identifier of a logical channel for the logical channel configuration information.

15. The method of claim 4,
    wherein the one or more logical channels is associated with physical (PHY) information of an uplink, and
    wherein the PHY information of the uplink grant corresponds to the information related to the OFDM numerology.

16. The method of claim 4,
    wherein the RRC message is an RRC connection reconfiguration message or an RRC setup message, and
    wherein the RRC message further includes an identifier of a logical channel for the logical channel configuration information.

17. The UE of claim 7, wherein the at least one processor is, to select the one or more logical channels, configured to:
    obtain physical (PHY) information of the uplink grant, the PHY information corresponding to the information related to the OFDM numerology, and
    select one or the one or more logical channels that is associated with the PHY information.

18. The UE of claim 7,
    wherein the RRC message is an RRC connection reconfiguration message or an RRC setup message, and
    wherein the RRC message further includes an identifier of a logical channel for the logical channel configuration information.

19. The base station of claim 10,
    wherein the one or more logical channels is associated with physical (PHY) information of the uplink, and
    wherein the PHY information of the uplink grant corresponds to the information related to the OFDM numerology.

20. The base station of claim 10,
    wherein the RRC message is an RRC connection reconfiguration message or an RRC setup message, and
    wherein the RRC message further includes an identifier of a logical channel for the logical channel configuration information.

* * * * *